(12) United States Patent
Setzer, Sr. et al.

(10) Patent No.: US 7,914,017 B2
(45) Date of Patent: Mar. 29, 2011

(54) PORTABLE APPARATUS FOR TRANSPORTING ITEMS WITH A POWERED LIFTING FEATURE

(76) Inventors: Mitchell Olin Setzer, Sr., Lenoir, NC (US); Larry Richard Setzer, Sr., Lenoir, NC (US)

( * ) Notice: Subject to any disclaimer, the term of this patent is extended or adjusted under 35 U.S.C. 154(b) by 333 days.

(21) Appl. No.: 12/046,886

(22) Filed: Mar. 12, 2008

(65) Prior Publication Data
US 2008/0224433 A1 Sep. 18, 2008

Related U.S. Application Data

(60) Provisional application No. 60/894,242, filed on Mar. 12, 2007.

(51) Int. Cl.
*B62B 1/04* (2006.01)
(52) U.S. Cl. .................... 280/47.29; 280/47.17
(58) Field of Classification Search .............. 280/47.17, 280/47.18, 47.24, 47.27, 47.28, 47.29
See application file for complete search history.

(56) References Cited

U.S. PATENT DOCUMENTS

| | | | | |
|---|---|---|---|---|
| 795,147 | A * | 7/1905 | Magoffin | 414/639 |
| 2,895,567 | A * | 7/1959 | Hall | 187/224 |
| 3,907,138 | A | 9/1975 | Rhodes | |
| 4,034,878 | A | 7/1977 | Fox | |
| 4,049,083 | A | 9/1977 | Garvey | |
| 4,068,773 | A * | 1/1978 | Downing et al. | 414/636 |
| 4,728,245 | A | 3/1988 | Shelton | |
| 4,741,659 | A | 5/1988 | Berg | |
| 5,251,922 | A | 10/1993 | Mann | |
| 5,417,536 | A * | 5/1995 | Cech | 414/21 |
| 5,575,605 | A | 11/1996 | Fisher | |
| 5,837,946 | A * | 11/1998 | Johnson et al. | 177/136 |
| 5,967,734 | A | 10/1999 | Liu | |
| 5,995,001 | A * | 11/1999 | Wellman et al. | 340/438 |
| 6,530,740 | B2 * | 3/2003 | Kim | 414/490 |
| 6,929,443 | B1 | 8/2005 | Nellis | |
| 7,163,213 | B2 | 1/2007 | Chambers | |
| 7,278,645 | B1 * | 10/2007 | Davis | 280/47.28 |
| 2005/0036865 | A1 * | 2/2005 | Matter | 414/490 |

OTHER PUBLICATIONS

Ronton, Application Engineering, Roton Products, Inc., 8 Pages.
Ronton, Identifying Screw Threads, Roton Products, Inc., 5 Pages.
LIFTKAR, Powered Stair Climbing Hand Truck, 4 Pages.
WESCO, Cobra Pro Battery Powered Hand Trucks, 2 Pages.

* cited by examiner

*Primary Examiner* — J. Allen Shriver, II
*Assistant Examiner* — John D Walters
(74) *Attorney, Agent, or Firm* — Monty Simmons; Simmons Patents

(57) ABSTRACT

One embodiment of the invention relates to an electronic module associated with a hand truck structure comprising a powered lifting/lowering tray wherein the electronic module comprises a scale electrically associated with a control unit. The control unit is configured for causing a tray rise and lower as desired. The scale is mechanically associated with the tray for measuring the weight of an item placed on the scale. Such an electronic module provides for features including: automatic safety shutoff at maximum upper and lower positions, automatic weighting of a package, automatic warning when weight of package exceeds a predefined maximum weight value, power supply monitoring and warnings, time stamped data, location stamped data, transport directions, automatic customer information lookup, wireless link to remote computing device, wired or wireless link between the scale and the controller, locking feature, power management and power generation features, imaging features, audio features, and self diagnostic features.

20 Claims, 21 Drawing Sheets

PORTABLE APPARATUS FOR TRANSPORTING ITEMS WITH A POWERED LIFTING FEATURE

CLAIM TO PRIORITY

This application claims priority to provisional application 60/894,242 filed on Mar. 12, 2007, the entire contents of which are incorporated herein by this reference for all purposes.

TECHNICAL FIELD OF THE INVENTION

The present invention relates to an apparatus and method for electronically controlling and providing automatic features to a manual-transporting device used to transport items wherein the apparatus comprises a powered lifting/lowering feature.

BACKGROUND OF THE INVENTION

There are many well known small, hand-propelled vehicles used for manually transporting small loads. One such device is a hand truck having a generally L-shaped body with wheels at the base of the L-shaped body and handles at the top with a small ledge to set objects. Such ledge is typically level with a support surface when the hand-truck is upright. An object to be moved is tilted forward, the ledge is inserted underneath such object, the object is then allowed to tilt back and rest on the ledge. Then the truck and object are tilted backward until the weight is balanced over the large wheels, making otherwise bulky and heavy objects easier to move.

Improvements to such hand-propelled vehicles have been developed over the years. One improvement relates to providing powered lifting, lowering and transporting features. One example of such a prior art device is disclosed in U.S. Pat. No. 6,530,740 issued to Kim on Mar. 11, 2003. Kim teaches a hand truck with an electrically operated lifting platform. While Kim is an improvement over the prior art hand-propelled vehicles, the Kim hand truck does not fully address several problems related to providing a powered hand truck device with powered features; some of which are discussed below. In addition, Kim provides no teachings related to associating an electronic module for providing automatic features to such the system (as described later).

First, while the Kim device does use a ball screw configuration in the powered lifting system, the lifting systems requires the use of rollers that rotate in the up direction but not in the down direction thereby providing a braking feature. What is needed is a system that provides for dynamic breaking and eliminates the need for unidirectional rollers.

Second, the Kim device uses only one vertical lifting mechanism. Thus, there is no redundancy in the lifting mechanism which diminishes safety and reliability as one lifting mechanism is subjected to the entire load. What is needed is a system that provides for a plurality of lifting mechanism that share loading.

Third, the Kim device uses springs to provide for a counter balance. What is needed is a system that does not require such springs.

Fourth, Kim (an not known similar prior art device) does not provide for an electronic module for providing a plurality of features including: automatic weighting of a package, automatic warning when weight of package exceeds a predefined maximum weight value, power supply monitoring and warnings, time stamped data, location stamped data, transport directions, automatic customer information lookup, wireless link to remote computing device, wired or wireless link between a scale and a controller, locking feature, power management and power generation features, imaging features, audio features, and self diagnostic features.

SUMMARY

Some of the objects and advantages of the invention will now be set forth in the following description, while other objects and advantages of the invention may be obvious from the description, or may be learned through practice of the invention.

Broadly speaking, a principle object of the present invention is to provide a portable apparatus for manually transporting items with a powered lifting and lowering feature.

Yet another object of the invention is to provide a portable apparatus for manually transporting items comprising a powered lifting and lowering feature, wherein said apparatus comprises load sharing features that provide for improved reliability and safety.

Still another object of the invention is to provide a portable powered apparatus for transporting, lifting, and lowering items wherein said apparatus comprises load sharing features that provide for improved reliability and safety and a self-breaking feature when power to the lifting system is interrupted.

Yet another object of the invention is to provide a portable powered apparatus for transporting, lifting, and lowering items wherein the apparatus comprises a secondary access point for activating the lifting and lowering feature (i.e. a "manual" backup).

Another object of the invention is to provide for portable powered dolly for transporting items wherein the dolly comprises dual vertical screws mechanically associated with a tray wherein such screws are further mechanically associated with a powered force-to-movement converter configured for rotating the vertical screws thereby lifting and lowering the tray wherein the dual vertical screws provide for at least one of (a) stability and load sharing, and (b) redundant self-breaking.

Another object of the invention is to provide for a portable powered dolly for transporting items wherein the dolly comprises dual vertical screws mechanically associated with a tray wherein such screws are further mechanically associated with a powered force-to-movement converter configured for rotating the vertical screws thereby lifting and lowering the tray and further comprising controller system associated with the dolly for controlling powered the lifting and lowering feature.

Other objects of the invention are to provide an electronic module for associating with a manual transportation device that provides at least one of the following features: automatic safety shutoff at maximum upper and lower positions, automatic weighting of a package, automatic warning when weight of package exceeds a predefined maximum weight value, power supply monitoring and warnings, time stamped data, location stamped data, transport directions, automatic customer information lookup, wireless link to remote computing device, wired or wireless link between the scale and the controller, locking feature, power management and power generation features, imaging features, audio features, and self diagnostic features.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.). Similarly, two or more items are "electrically associated" by bringing them together or into relationship with each other in any number of ways including: (a) a direct, indirect or inductive communication connection, and (b) a direct/indirect or inductive power connection.

One exemplary embodiment of the present invention relates a portable apparatus for manually transporting items, the apparatus including a powered lifting feature. The apparatus comprises vertically extending support columns, including upper and lower portions. For the presently preferred embodiment there are two support columns where each support column is preferably configured for housing a vertical motion facilitator. A vertical motion facilitator is simply a linear actuator configured for converting some kind of power, such as hydraulic or electric power, into linear motion. When a linear actuator is properly oriented, such linear motion is vertical motion. Examples of vertical motion facilitators include power screws (e.g. lead (or machine) screws—which have sliding contact between the nut and screw—and ball screws—which operate on rolling contact), ropes, chains, pneumatic cylinders, and hydraulic cylinders. The apparatus further comprises at least two wheels carried adjacent said lower portion of said support columns. A handle portion is carried adjacent an upper portion of the support columns and joins the upper portions of said vertically extending support columns.

The apparatus further comprises a vertical motion facilitator interface movably associated with each of the vertical motion facilitators. Examples of vertical motion facilitator interfaces include nuts, ball nuts, clamps, bolts, and brackets depending on the vertical motion facilitator selected. Each vertical motion facilitator interface is mechanically associated with a tray configured for holding an item to be transported. The tray extends transversely from said support columns to a point that is a predefined distance from the support columns.

A force-to-movement converter is mechanically associated with said vertical motion facilitators and is configured for activating said vertical motion facilitator. The force-to-movement-converter is configured for receiving a substance that flows into the force-to-movement-converter thereby creating a force that is converted into a movement that moves said vertical motion facilitator in one of a plurality of directions and wherein the direction of movement is determined by the substance flow path. Examples of force-to-movement converts include electric motors, pneumatic motors, and hydraulic motors. The substance flowing into the force-to-movement-converter may be electrons (e.g. electrical motor), a gas (e.g. a pneumatic system), and a fluid (e.g. a hydraulic system). The device that provides the substance flowing into the force-to-movement converter is called the power source. For the presently preferred embodiment of the invention, the force-to-movement converter is an electric motor and the power source is a battery.

The apparatus further comprises a controller configured for selectively activating said force-to-movement converter so that the vertical motion facilitators are selectively activated to move the tray in a desired direction.

The apparatus may further comprise a rear gusset support disposed between said wheels and mechanically associated with a lower portion of said vertically extending support columns. The rear gusset support may be movably associated with such lower portion allowing the rear gusset support to be repositioned to provide improved stability. When fully upright with the distal end of the rear gusset support associated with the back side of the support columns, the rear gusset support provides for improved frame rigidity.

The apparatus may further comprise a manual activation interface mechanically associated with one of the vertical motion facilitators. Such manual activation interface is configured to allow a user to manually activate the vertical motion facilitator to selectively move the tray in a desired direction. Such a feature provides for a secondary method of activating the vertical motion facilitators should the power source fail, for example.

Yet another embodiment of the invention relates to methodology for adding a powered lifting feature to a portable apparatus for manually transporting items. The method includes the steps of forming a dolly structure comprising two vertically extending support columns. At least two wheels are provided adjacent to a bottom portion of said vertically extending support columns. The next step is to provide a handle carried adjacent an upper portion of the vertically extending support columns. Next, at least one vertical motion facilitator is provided. A force-to-movement converter associated with a power source is mechanically associated the vertical motion facilitator and is configured to activate the vertical motion facilitator. A tray is provided wherein the tray is mechanically associated with the vertical motion facilitator. A controller is provided wherein the controller is configured for selectively activating said force-to-movement converter so that the vertical motion facilitator is selectively activated to move said tray in a desired direction.

Additional embodiments of the present subject matter, not necessarily expressed in this summarized section, may include and incorporate various combinations of aspects of features or parts referenced in the summarized objectives above, and/or features or components as otherwise discussed in this application.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

DETAILED DESCRIPTION

Figure 1A:
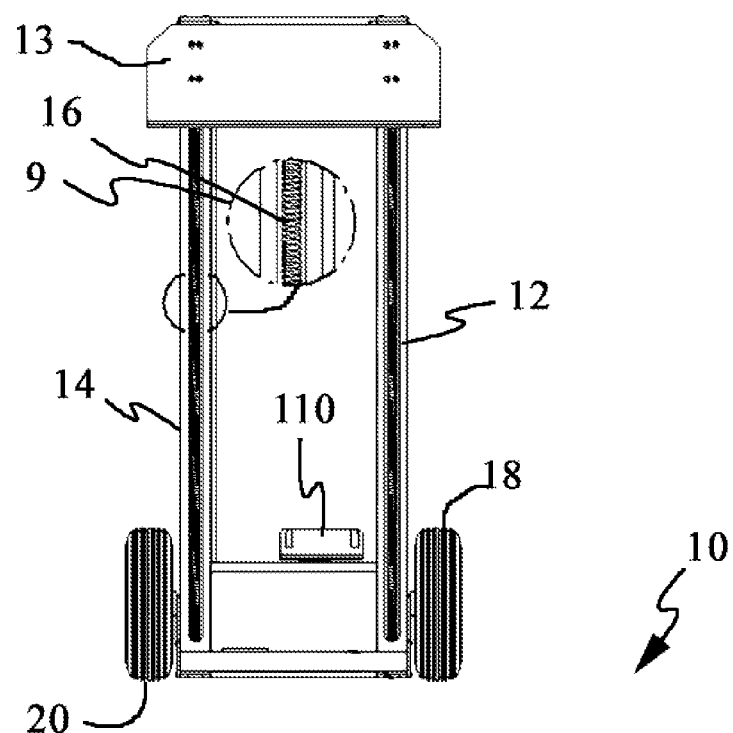
FIG. 1a is a front view of one exemplary embodiment of the invention comprising a dolly structure including two vertical support rails with each rail housing a ball screw rotatably associated with a ball nut, eat ball nut is further mechanically associated with a tray where the tray is at the upper most position.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

For the purposes of this document two or more items are "mechanically associated" by bringing them together or into relationship with each other in any number of ways including a direct or indirect physical connection that may be releasable (snaps, rivets, screws, bolts, etc.) and/or movable (rotating, pivoting, oscillating, etc.) Similarly, two or more items are "electrically associated" by bringing them together or into relationship with each other in any number of ways including: (a) a direct, indirect, wireless, or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

While this section of the specification may contain headers, such headers are simply place markers and do not form a part of the specification and are not to be used in the construction of the specification.

While the particulars of the present invention and associated technology may be adapted for use with any type of apparatus for manually transporting items, the examples discussed herein are primarily in the context of a hand truck/dolly structure.

Figure 1B:
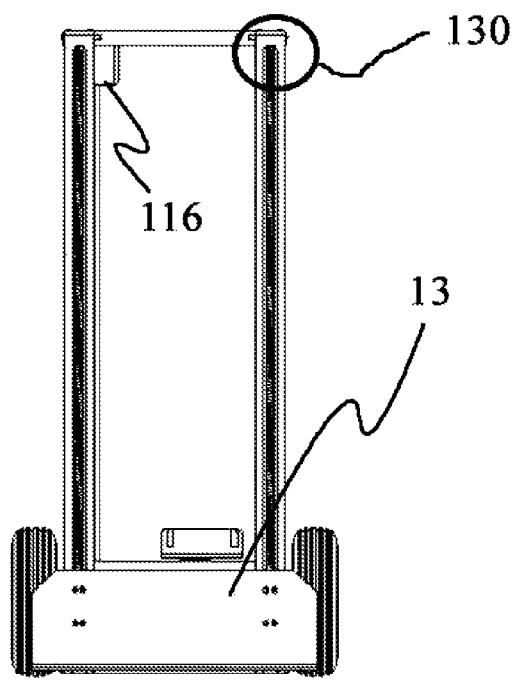
FIG. 1b is a front view of the image in FIG. 1a with the tray at the lower most position.
Figure 2:
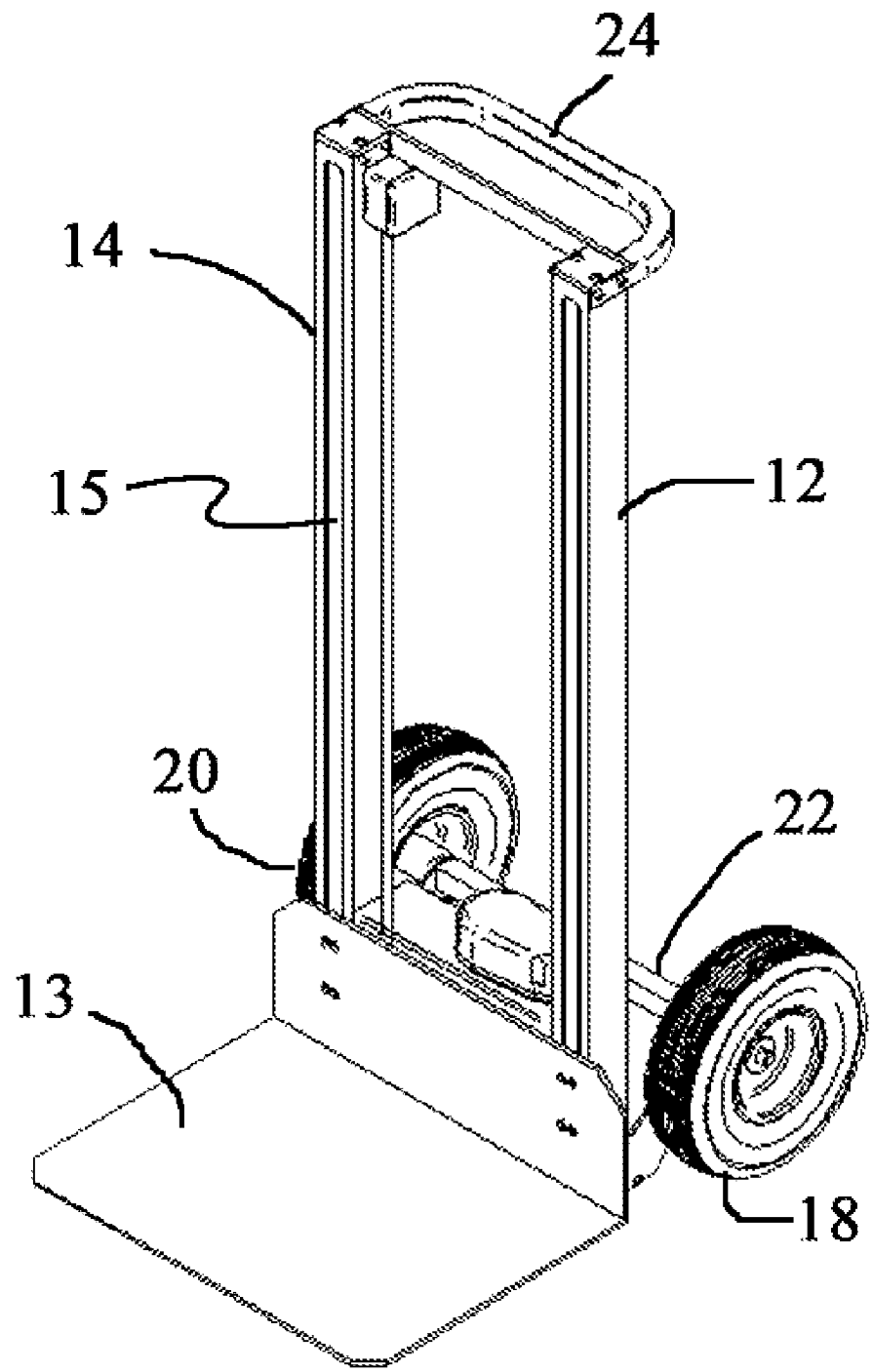
FIG. 2 is a front side elevated perspective view of the dolly in FIG. 1b.

Referring now to FIG. 1a, FIG. 1b, and FIG. 2, a front view is presented of one embodiment of the invention comprising a dolly (10) structure including two vertically extending support columns (12, 14). Each support column is configured to house a vertical motion facilitator (16). A close up view of such a configuration is provided in circle (9). For the presently preferred embodiment, dolly (10) further comprises two wheels (18, 20). Wheel (18) is carried adjacent to a lower section of support column (12) and wheel (20) is carried adjacent to a lower section of support column (14). In FIG. 1a, a tray (13) is positioned at an upper most position and in FIG. 1b tray (13) is positioned at a lower most position.

Figure 3A:
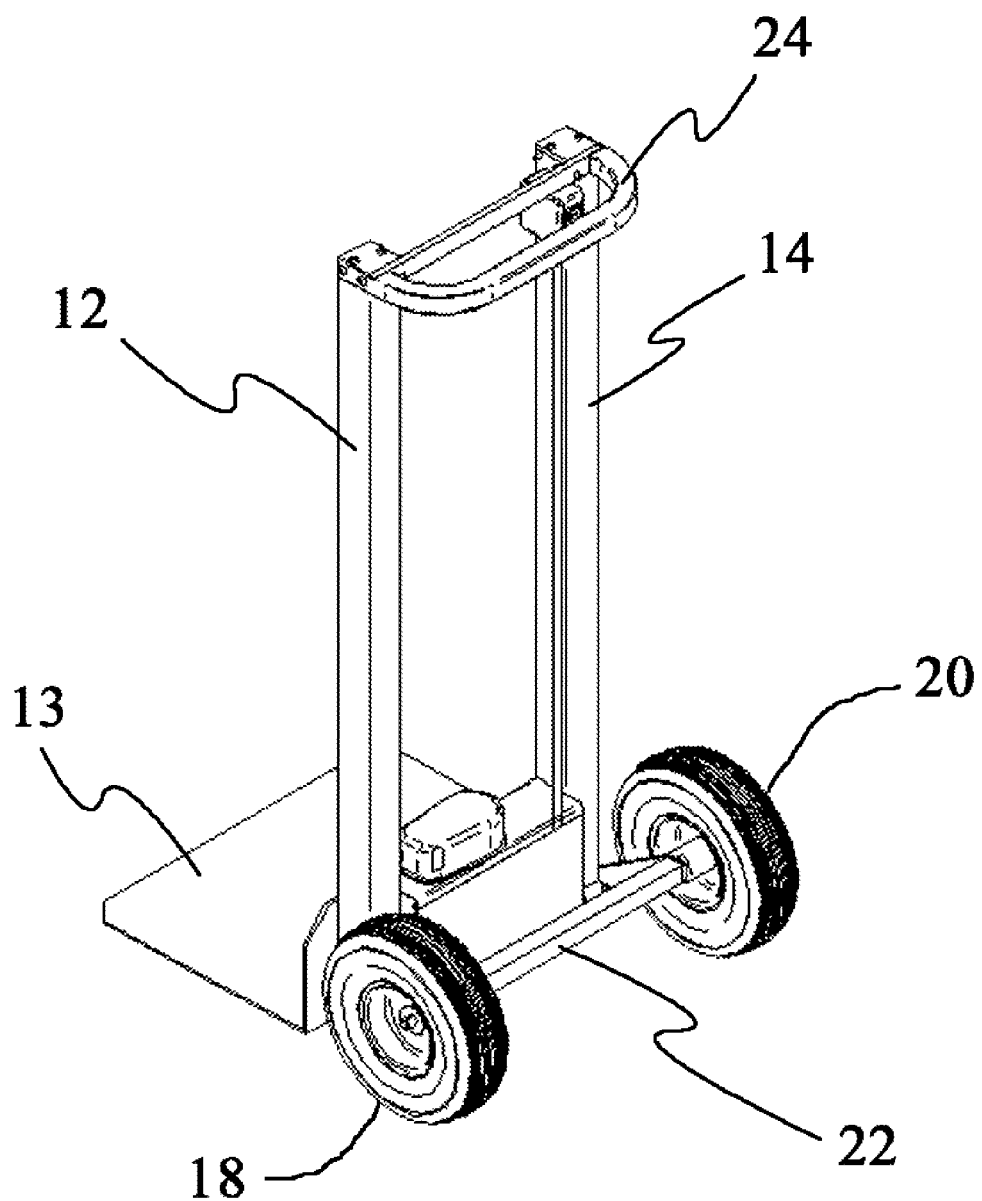
FIG. 3a is a back side elevated perspective view of the dolly in FIG. 1b.
Figure 3B:
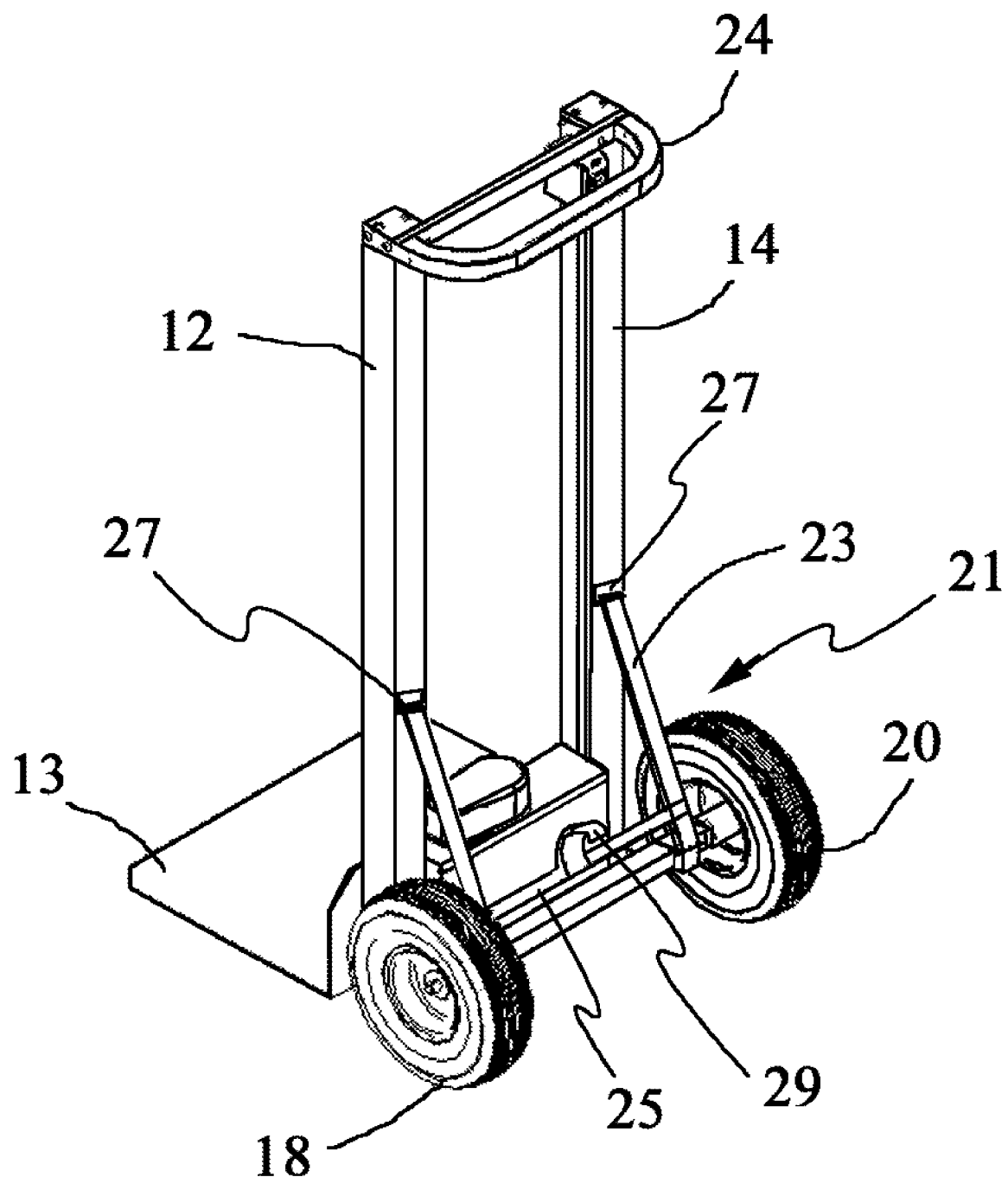
FIG. 3b is a back side elevated perspective view of the dolly in FIG. 3a further comprising a support-gusset pivotally associated with an axel housing.

Referring now to FIG. 3a and FIG. 3b, one end of axel housing (22) is mechanically associated with a lower portion of support column (12) with the other end is mechanically associated with support column (14). Axel housing (22) is configured for housing an axel mechanically associated with wheel (18) and wheel (20). One of ordinary skill in the art will appreciate that such a configuration improves the structural rigidity of the lower portion of apparatus (10). Alternatively, the apparatus may comprise two axels, one for each wheel where the axels do not extend across the full length of axel housing (22). For such an embodiment, axel housing (22) may be replaced by a lower horizontal support member.

Apparatus (10) may further comprise rear gusset support (21) comprising support arms (23) mechanically associated with cross member (25). Rear gusset support (21) is disposed between wheel (18) and wheel (20) and may be movably associated with axel housing (22). When placed in the up position, the distal ends (27) of support arms (23) are mechanically associated with the back sides of support column (12) and support column (14). Thus, the up position enhances the structural stability of apparatus (10). When placed in the down position, support arms (23) releasably lock into position with distal ends (27) preferably making contact with the surface supporting apparatus (10). Such a configuration provides improved vertical stability when apparatus (10) is lifting/lowering a load. Rear gusset support

(21) may further comprise foot lever (29). Foot lever (29) is configured to assist a user in tilting apparatus (10) in the backward direction.

Referring now to handle portion (24), as shown in FIG. 3b, handle portion (24) is carried adjacent an upper portion of the support column (12) and support column (14). The handle portion (24) is mechanically associated with an upper portion of support column (12) at one end and extends horizontally to a point where a second end is mechanically associated with an upper section of support column (14).

Figure 4:
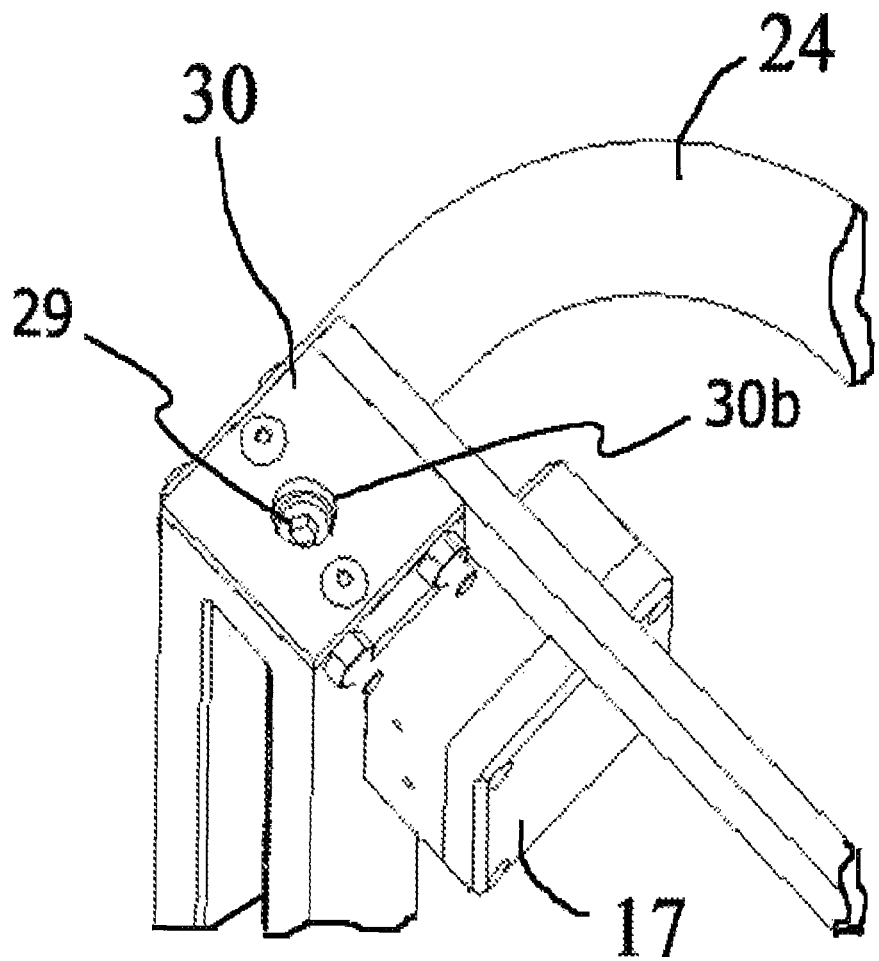
FIG. 4 is a close up perspective view of the top of a vertical support column comprising a secondary vertical motion facilitator activation point.
Figure 5:
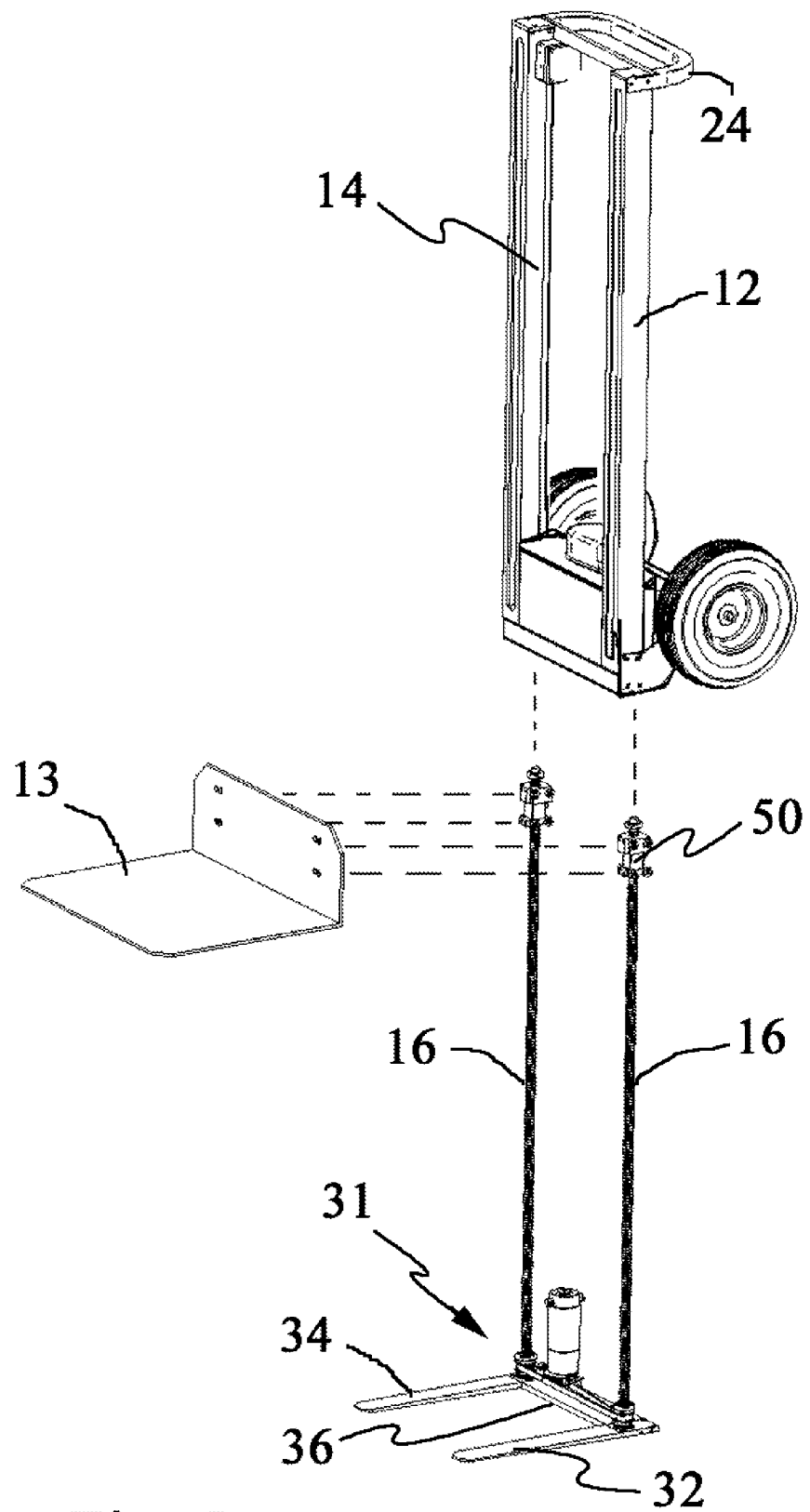
FIG. 5 is an exploded view of the dolly in FIG. 2.

As can be seen in FIG. 1a and FIG. 1b, support column (12) and support column (14) are each configured for housing a vertical motion facilitator (16) and vertical motion facilitator interface (50, FIG. 5). For the presently preferred embodiment, the support columns define a hollow housing comprising a vertical interface slot (15) configured for providing access to the vertical motion facilitators and vertical motion facilitator interfaces as well as allowing vertical movement of the tray (13). The tops of vertical support column (12) and (14) are mechanically associated with support column covers (30, FIG. 4).

For the presently preferred embodiment of the invention there are two support columns and two vertical motion facilitators. It should be appreciated that only one vertical support column and one vertical motion facilitator may be used without departing from the scope and spirit of the invention. For example, one alternative embodiment may comprise one vertical support column with one vertical motion facilitator mechanically associated with the approximate center of tray (13). Similarly, more than two vertical columns may be used and not all vertical columns need house a vertical motion facilitator. Similarly, more than two vertical motion facilitators may be used and more than one drive assembly and power source may be used to provide for independent drive systems.

Referring now to FIG. 4, in the presently preferred embodiment, at least one column cover (30) provides access to a vertical motion facilitator to provide for secondary activation of the vertical motion facilitator. For this embodiment, column cover (30) defines access (30b) for gaining access to secondary activation point (29). Secondary activation point (29) is configured for receiving a secondary vertical motion facilitator activator. Exemplary secondary vertical motion facilitator activators include (a) a hand crank for manual activation, and (b) a powered device such as a hand drill. The secondary vertical motion facilitator activator is useful, for example, when the power source (described later) that powers the force-to-movement-converter fails.

Referring now to FIG. 5, an exploded view of one exemplary embodiment of the invention is presented showing the vertical motion facilitators (16) associated with vertical motion facilitator interfaces (50). A vertical motion facilitator is simply a linear actuator configured for converting some kind of power, such as hydraulic or electric power, into linear motion. When a linear actuator is properly oriented, such linear motion is vertical motion. Examples of vertical motion facilitators include power screws (e.g. lead (or machine) screws—which have sliding contact between the nut and screw—and ball screws—which operate on rolling contact), ropes, chains, pneumatic cylinders, and hydraulic cylinders. Examples of vertical motion facilitator interfaces include nuts, speed nuts, ball nuts, clamps, bolts, and brackets and other suitable devices.

For the preferred embodiment, the vertical motion facilitator (16) is a power screw. For the purposes of this document, power screws fall into two basic categories: lead screws (which have sliding contact between the nut and screw), and ball screws (which have a rolling contact between the nut and screw). One embodiment of a sliding contact nut assembly is a "speed nut." Speed nuts are typically cast in one piece with no moving parts and are commercially available in Plastic (acetal and PTFE—polytetrafluoroethylene) and bronz. Plastic nuts are preferably used with stainless steel screws while bronze nuts are preferably used with carbon steel screws.

In contrast, ball screw assemblies use recirculating ball bearings that roll along the helical grooves in the screw and nut (as described later). Such a configuration minimizes or eliminates sliding friction.

For the presently preferred embodiment, the type of power screw used is a ball screw and the vertical motion facilitator interface (50) is a ball nut assembly (hereafter referred to as ball screw (16) and ball nut assembly (50) respectively). Such a ball screw (16) and ball nut assembly (50) configuration forms is a mechanical device for translating rotational motion to linear motion. The threaded shaft of ball screw (16) provides a spiral pathway for ball nut assembly (50).

As shown in FIG. 5, ball screws (16) and ball nut assembly (50) are inserted into the bottom of support columns (12) and (14). The bottom of support columns (12) and (14) are then mechanically associated with out rigger support (31). Outer rigger support (31) comprises support arm (32) and support arm (34). Such support arms are connected at one end by gear assembly housing (36, FIG. 9). Support arms (32) and (34) are configured to receive fasteners (82, FIG. 9) for mechanically associating outer rigger support (31) and assembly housing (36) with support columns (12) and (14). Tray (13) is mechanically associated with ball nut assembly (50) with fasteners (83, FIG. 9) such as screws, rivets, bolts or any other suitable fastener. As can be seen in FIG. 5, support arm (32) extends transversely from said support column (12) and support arm (34) extends transversely from support column (14). Such a configuration provides for improved stability when tray (13) is moved toward the upper most position as shown in FIG. 1a.

Figure 6:
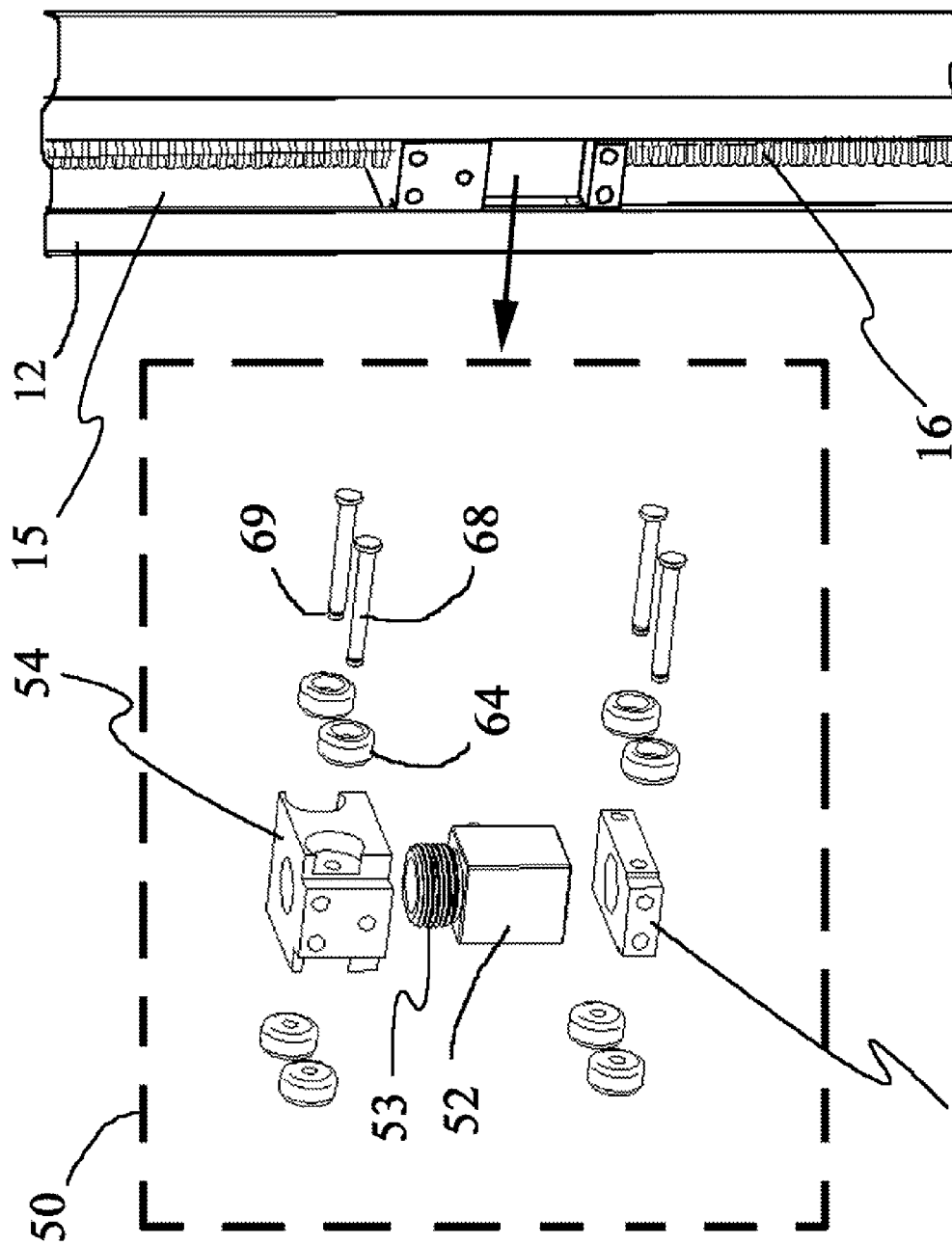
FIG. 6 is an exploded view of the ball nut assembly comprising a ball nut, an upper carrier and a lower carrier.
Figure 7:
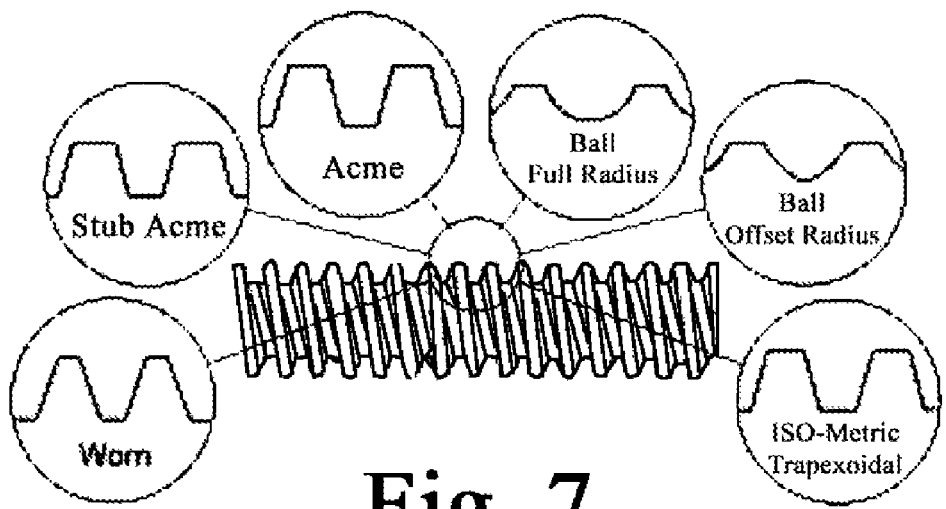
FIG. 7 is a view of exemplary thread types.
Figure 8:
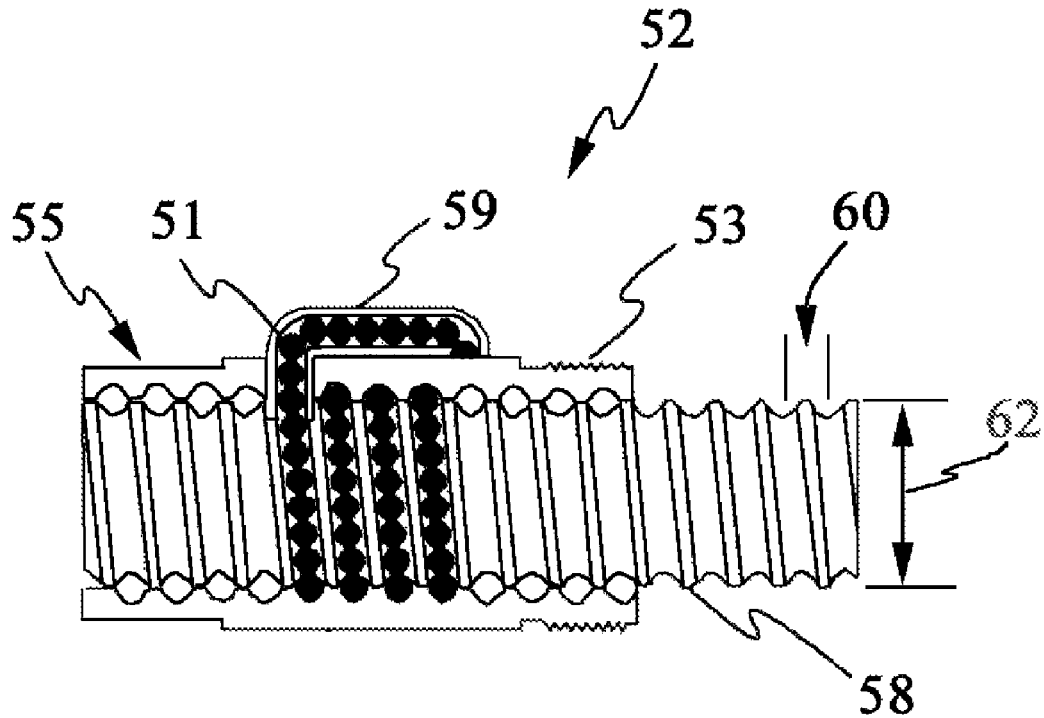
FIG. 8 is a side cut away view of an exemplary ball nut and ball screw configuration.

Referring now to FIG. 6, FIG. 7 and FIG. 8, the ball screw (16) and ball nut assembly (50) are examined in more detail. Exemplary thread types for ball screw (16) are shown in FIG. 7 although other thread types may be used without departing from the scope and spirit of the invention. When the vertical motion facilitator (16) is a screw, such screw may use any well known thread type and may or may not be self-breaking (or self-locking). A system that is not self-breaking will lower under load due to backdriving. Backdriving is the result of the load pushing axially on the screw or nut to create rotary motion. Generally speaking, a system with efficiency of greater than 50% will have a tendency to backdrive. Thus, if a self-breaking system is required, a system with efficiency of less than 35% is normally selected. Otherwise, a break is required to prevent backdriving or the technology described below is employed. Consequently, certain embodiments of the invention use a breaking device to prevent backdriving while other embodiments are configured to inherently prevent backdriving (called dynamic breaking).

Breaking devices are known and understood by those skilled in the art, and a detailed explanation thereof is not necessary for purposes of describing the method and system according to the present invention.

One method of making a self-breaking system (i.e. a system with dynamic breaking) is to use a power screw/speed nut combination and to manipulate the thread type and thread pitch of the power screw. Power screws with a rolled acme threads used with "speed nuts" (aka "super nuts") are generally 50-60% efficient. Thus, such a combination will not normally be self locking. However, for a rolled acme thread power screw with a thread pitch that is about one-third the power screw diameter, and used in combination with a speed nut, the system will be self-breaking.

As previously noted for the presently preferred embodiment, vertical motion facilitator (16) is a ball screw and the vertical motion facilitator interfaces (50) is a ball nut. Ball screws with machined ball screw threads in combination with a ball nut comprising recirculating ball bearings are 90%+ efficient. Such Ball screws/ball nut combinations are not normally self-breaking. However, as described below, the preferred embodiment of the invention using ball screws and ball nuts will be self-breaking.

First, a couple of thread parameter definitions are considered. Thread Pitch is defined as the axial distance between threads and is equal to the lead in a single start screw. Thread Lead is the axial distance the nut advances in one revolution of the screw. The thread lead is equal to the thread pitch times the number of starts (pitch×starts=lead). "Screw starts" is defined as the number of independent threads on the screw shaft.

Referring to FIG. 8, one exemplary embodiment of ball nut (52) is presented. Ball nut (52) houses ball bearings (51) which move along threads (58) and through return finger (59) thereby creating a continuous path as the nut moves along the ball screw. For this preferred embodiment, the thread pitch is less than one-third the screw diameter (62) for a ball screw using a single start thread. As shown in FIG. 8, the thread pitch (60) is 0.20 inches, the number of starts is one and the thread diameter (62) is ⅝ of an inch (0.625). Ball nut (52) further comprises external threads (53) configured for mechanically associating with upper carrier (54, FIG. 6). Ball nut (52) may further comprise threads in the area (55) configured for mechanically associating with lower receiver (56). For the present embodiment, however, lower carrier (56) does not receive threads and ball nut (52) does not include threads in area (55). Such a configuration simplifies assembly.

Referring back to FIG. 6, ball nut assembly (50) further comprises rollers (64) mechanically associated with the upper carrier (54) and the lower carrier (56). Rollers (64) are rotatably associated with carrier (54) and lower carrier (56) via roller axels (68). The distal end (69) of roller axels (68) is configured to secure the roller assembly together. For the embodiment depicted in FIG. 6, distal end (69) is configured to receive a c-clip. The roller assembly is rotatably associated with the inside of the support columns (12, 14). One of ordinary skill in the art will appreciate that wheels (64), upper carrier (54) and lower carrier (56) will absorb substantially all the forces that would otherwise generate side loading that may otherwise be applied to ball screw (16). Consequently, substantially all the loading on ball screw (16) is axial loading.

Figure 9:
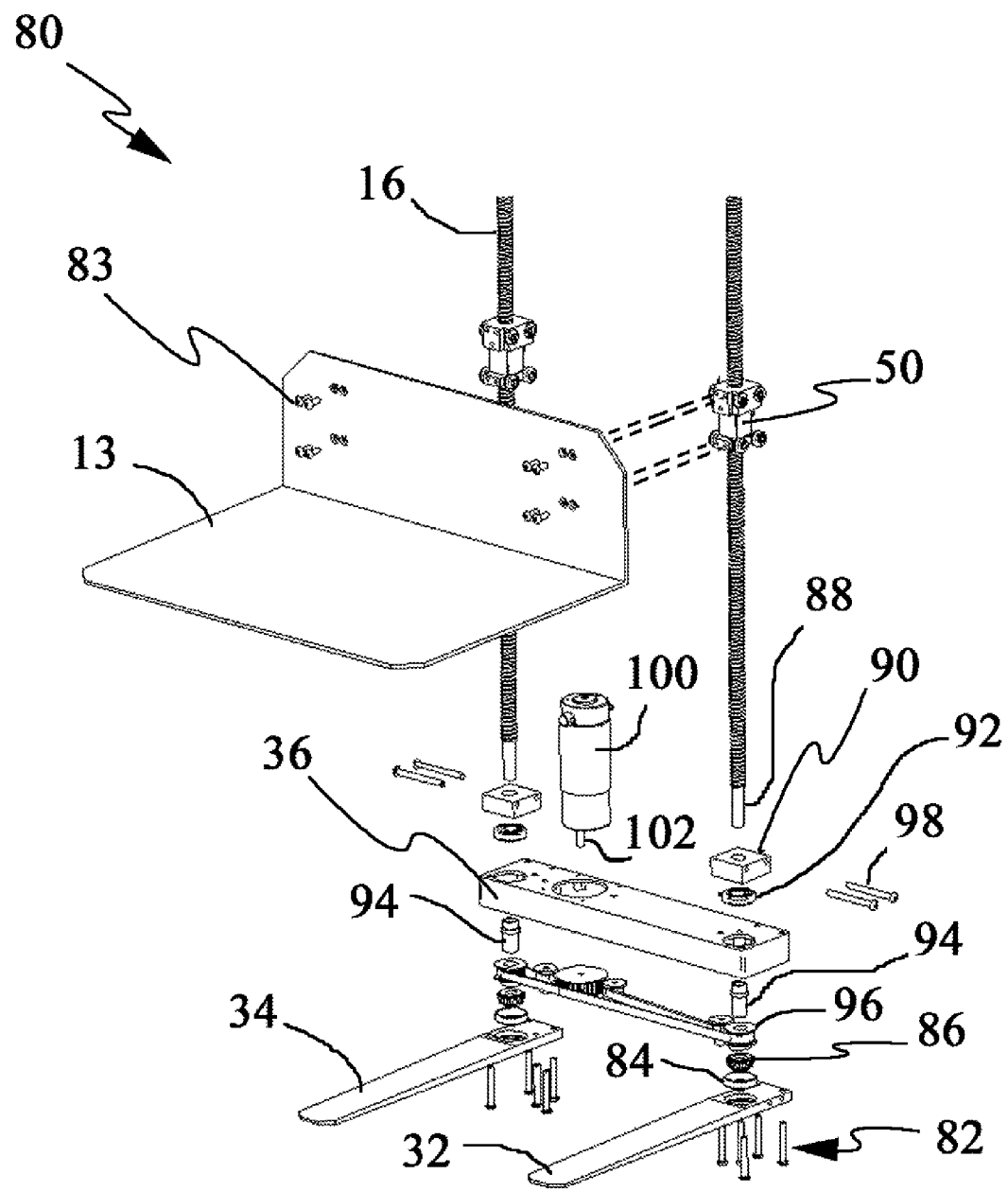
FIG. 9 is an exploded view of one embodiment of a drive system.

Referring now to FIG. 9, one exemplary drive system (80) associated with tray (13), ball screws (12) and (14), ball nut assemblies (50), and outrigger support (31) is presented. Bottom section (88) of ball screw (16) extends through bearing block (90), upper bearing (92), gear assembly housing (36), ball screw sleeve (94), thrust bearing pulley (96), thrust bearing (86) and then outer ring (84). Outer Ring (84) is configured for receiving thrust bearing (86) and for mechanically associating the bottom section (88) of ball screw (16) with support arm (32). Fasteners (98) mechanically associate support column (12) with the side of bearing block (90).

Figure 10:
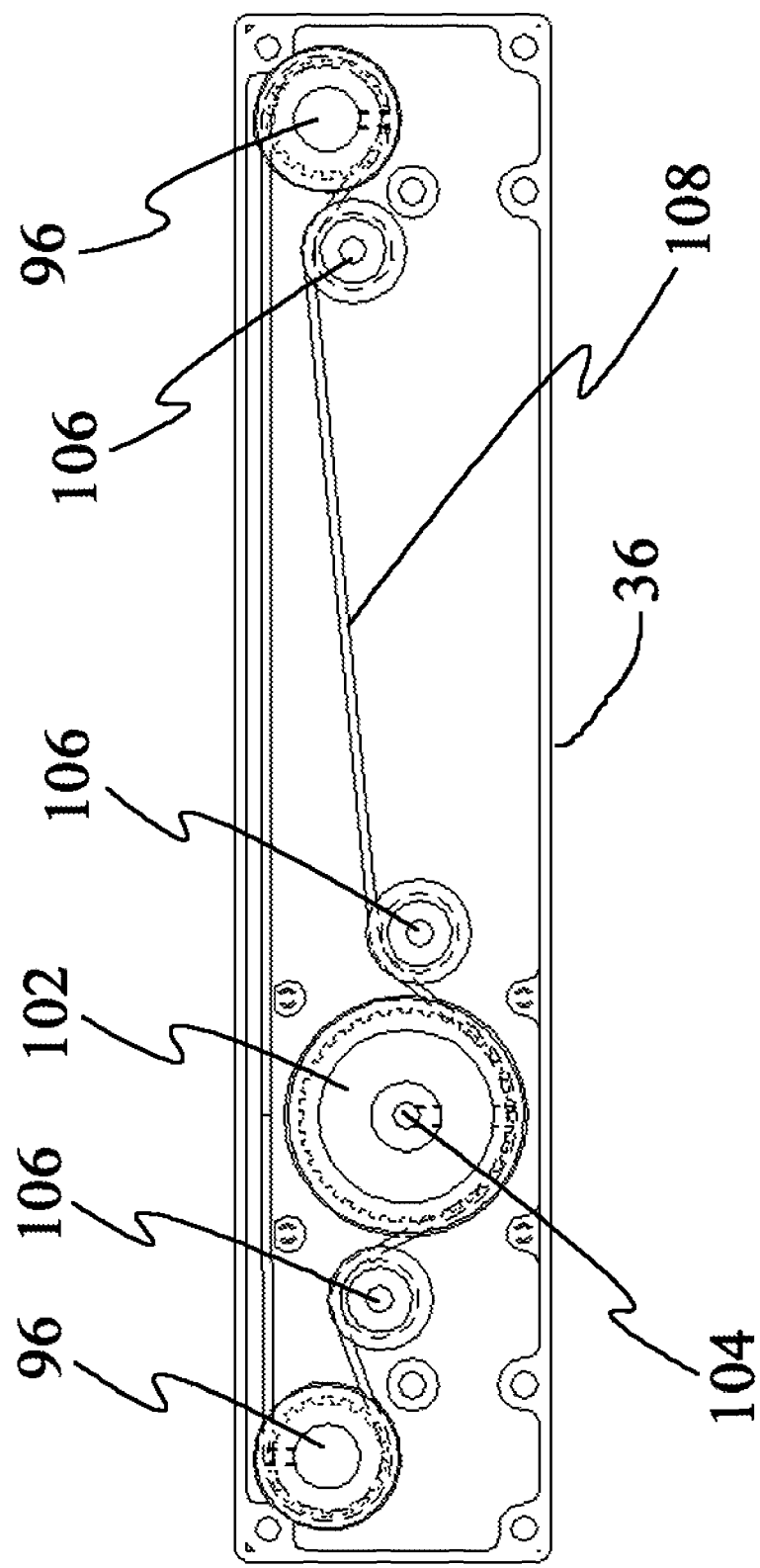
FIG. 10 is a top view of one exemplary gearing system.

The force-to-motion converter (100) comprise converter shaft (102) that is configured to mechanically associate with main drive pulley (104) (FIG. 10). For the purposes of this document, a force-to-movement converter is simply a device that receives a substance that flows into the force-to-movement-converter thereby creating a force that is converted into a movement in one or a plurality of directions and wherein the direction of movement is determined by the substance's flow path. Examples of force-to-movement converts include electric motors, pneumatic motors, and hydraulic motors. For the preferred embodiment, force-to-movement converter (100) is a 24 volt D.C. gear motor that generates 124 oz-in of torque at 597 rotations per minute (RPM) at the output shaft (hereafter referred to motor (100)). Motor (100) may have a plurality of speeds (e.g. dual speed motors).

Referring now to FIG. 10, one exemplary embodiment of a gearing assembly is presented. Main drive pulley (104) is mechanically associated with thrust bearing pulleys (96) via drive belt (108). Idler pulleys (106) have no teeth and provide a tension adjustment feature. For the presently preferred embodiment, main drive pulley (104) comprises 32 teeth while thrust bearing pulleys (96) comprise eighteen teeth. Such gearing used in conjunction with the ball screw configuration described above will lift at least a 110 lb load using the previously described gear motor powered by a 24 volt d.c., 2200 mAh battery. It should be appreciated that other gearing configurations and motor selections may be used without parting from the spirit and scope of the present invention.

Another advantage of the described drive system (80) used in conjunction with tray (13), ball screw (12) and (14), ball nut assembly (50) as previously described relates to self-breaking. It should be noted that since ball screws (12) and (14) rotate and ball nut assembly (50) travels vertically up/down the ball screws (without rotating around the ball screws), the system becomes inherently self-breaking if the proper gearing configuration is selected. Restated, for the above described system, to backdrive the ballscrews, the ball nut assembly (50) must turn the ballscrews as geared by the drive system. As noted previously, the above described drive system requires only 124 oz-in of torque at converter shaft (102) to lift 110 lbs. However, much more than 110 lbs of load is required to backdrive the ballscrews and turn converter shaft (102). Thus, if such a system is rated for 110 lbs, for its rated load, the system is self-breaking without the need for manipulating the thread pitch.

Figure 11:
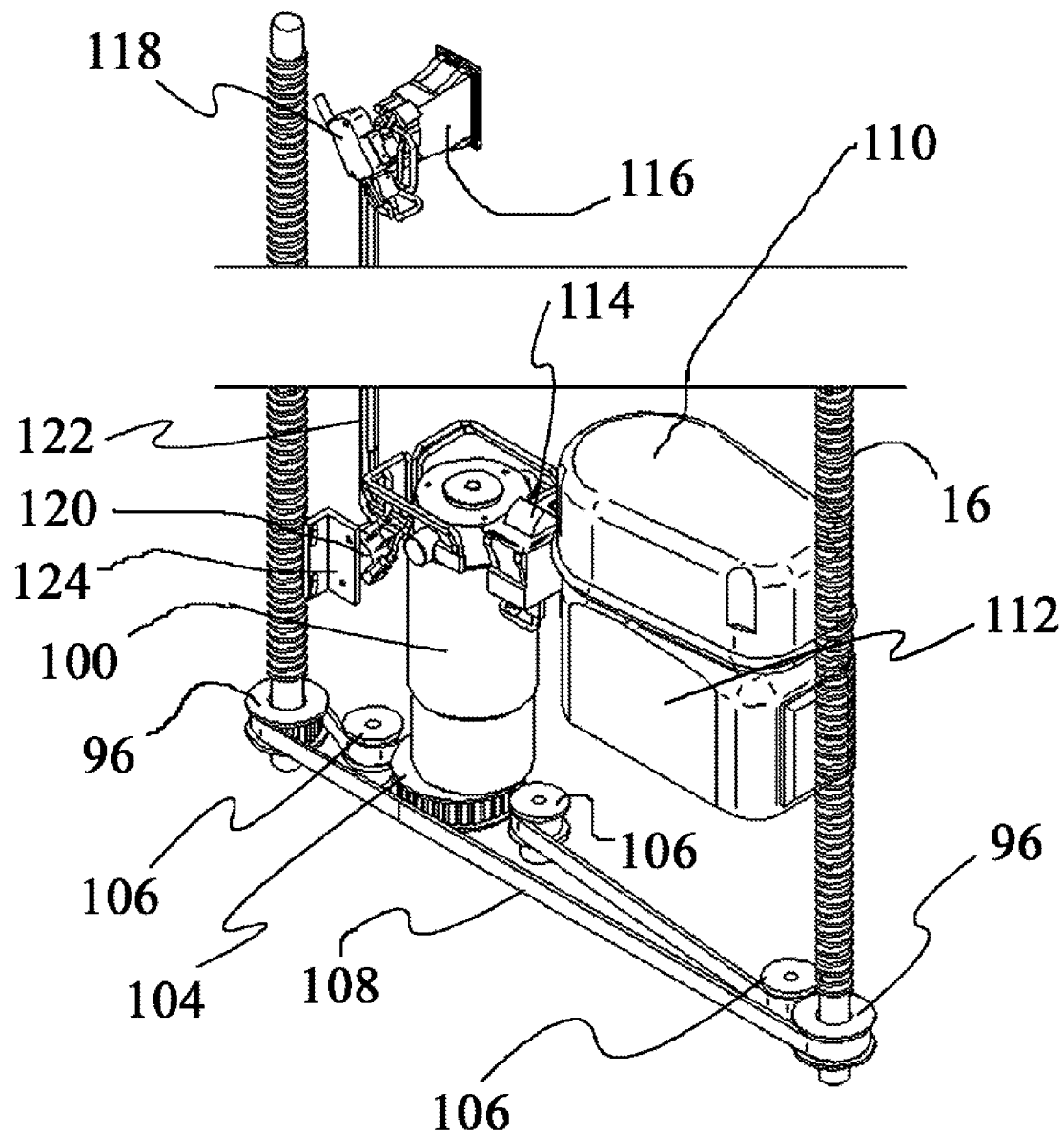
FIG. 11 is a view of one embodiment of the power lift system comprising a force-to-motion-converter electrically associated with a power source and further mechanically associated with a gearing system where the gearing system is mechanically associated with vertical screws.
Figure 12:
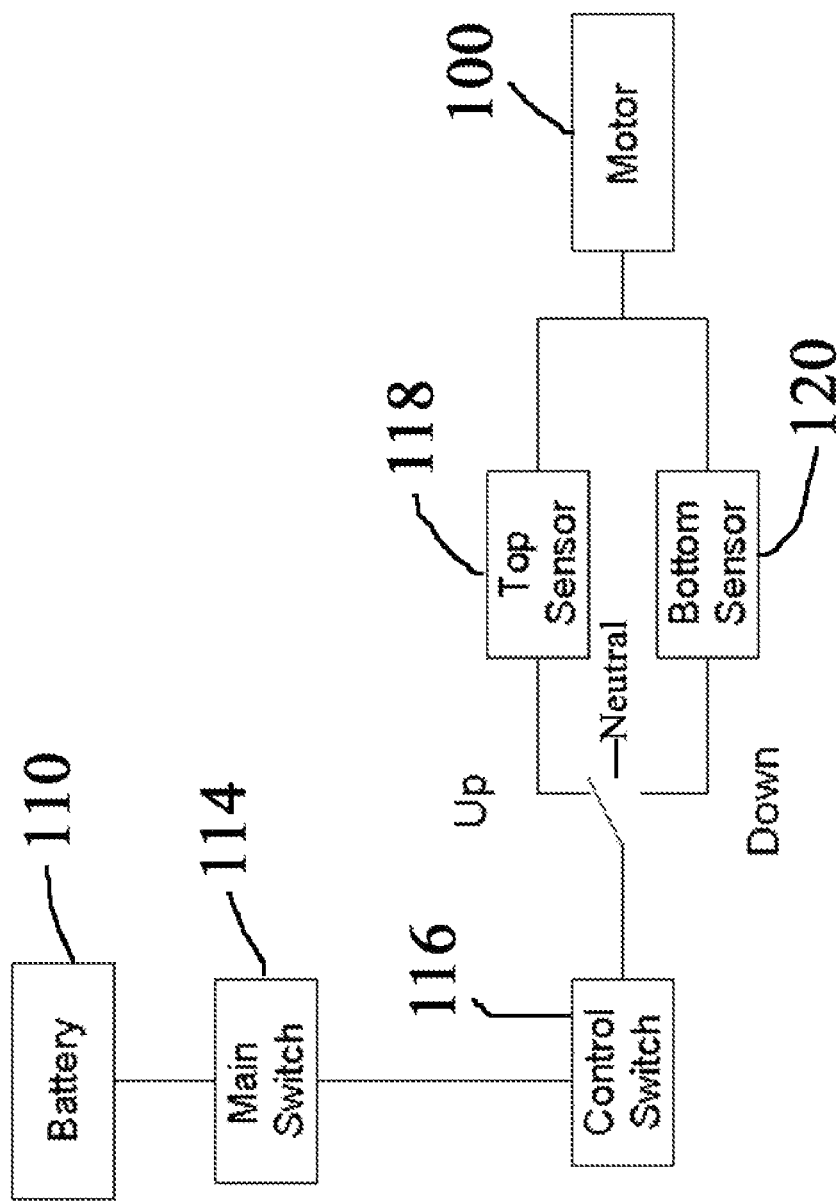
FIG. 12 is a block diagram representation of the electrical control system.

Referring now to FIG. 11 and FIG. 12, one exemplary control system and power source is presented. Power source (110) is received by power source receiver (112) and is electrically associated to Motor (100) through main switch (114). Main switch (114) is preferably a current limiting switch such as a switch comprising a circuit breaker function. Power from main switch (114) is routed to controller switch (116). Controller switch (116) is configured with neutral, up, and down switch positions. Limit switch (118) prevents tray (13) from traveling in the up direction beyond a predefined maximum height. Limit switch (120) prevents tray (13) from traveling in the down direction beyond a predefined minimum height. For the present exemplarily embodiment of the invention, the predefined maximum height and predefined minimum height are defined by positioning limit switch (118) and limit switch (120) as desired.

When controller switch (116) is placed in the neutral position, motor (100) is not activated. Assuming limit switch (118) is not actuated, when controller switch (116) is placed in the up position, power is applied to motor (100) so that it rotates converter shaft (102) in the direction that causes tray (13) to rise until controller switch (116) is returned to the neutral position or limit switch (118) is actuated. Assuming limit switch (120) is not actuated, when controller switch (116) is placed in the down position, power is applied to motor (100) so that it rotates converter shaft (102) in the direction that causes tray (13) to lower until controller switch (116) is returned to the neutral position or limit switch (120) is actuated.

Such a control system may be further configured with various safety features. One safety feature relates to area (130) of FIG. 1b at the top of vertical interface slot (15). Area (130) is a possible pinch point where a finger, for example, of an operator or someone near dolly (10) could be pinched when tray (13) is raised to its maximum height. To minimize or eliminate such a risk, limit switch (118) is positioned to prevent ball nut assembly (50) from rising to a point that would pinch an object inserted into vertical interface slot (15) in area (130).

Another safety feature would be to associate an object detector to the bottom of tray (13) or a lower portion of vertical support columns (12) and (14). Examples of suitable object detectors are laser sensors, light sensors, heat sensors. Such a sensor would be configured to detect an object near the bottom of dolly (10) and prevent tray (13) from lowering.

Another alternative embodiment is to extend vertical interface slots (15) a predefined distance beyond the threads so that the tray cannot extend to the above described pinch point.

Electronic Modules

Figure 14:
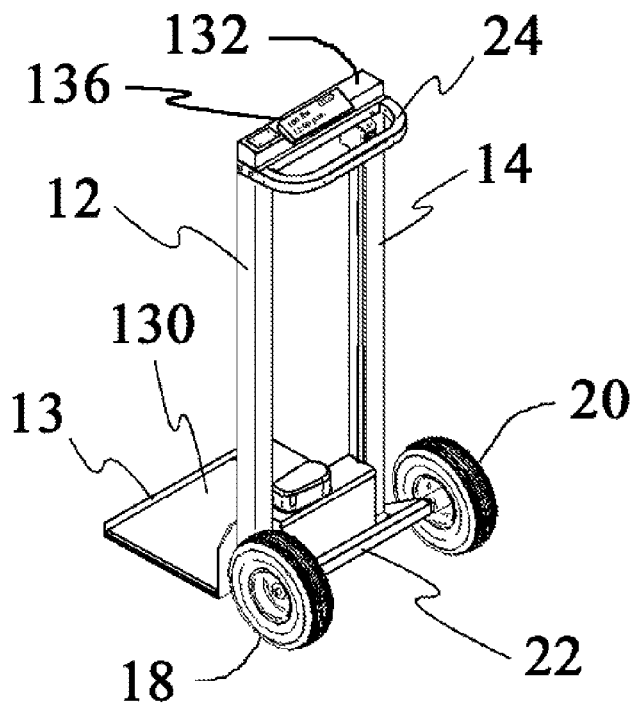
FIG. 14 is a back elevated side perspective view of the dolly in FIG. 13.
Figure 13:
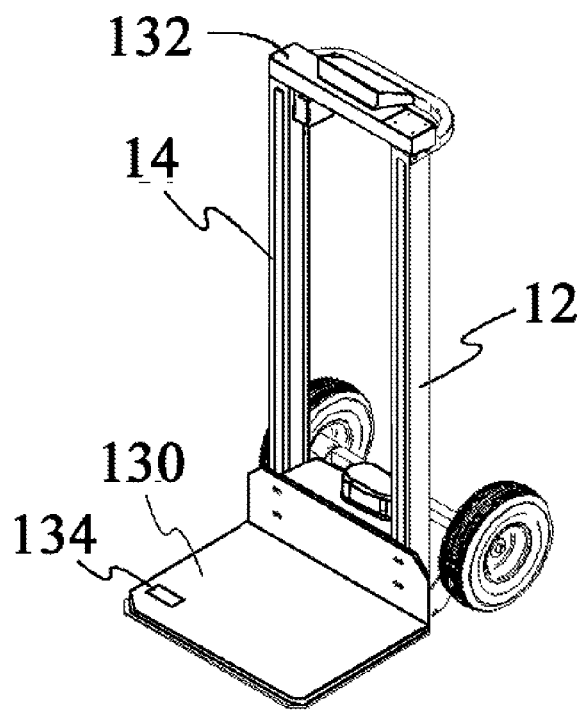
FIG. 13 is an elevated side perspective view of the dolly in FIG. 2 mechanically associated with a scale.
Figure 15:
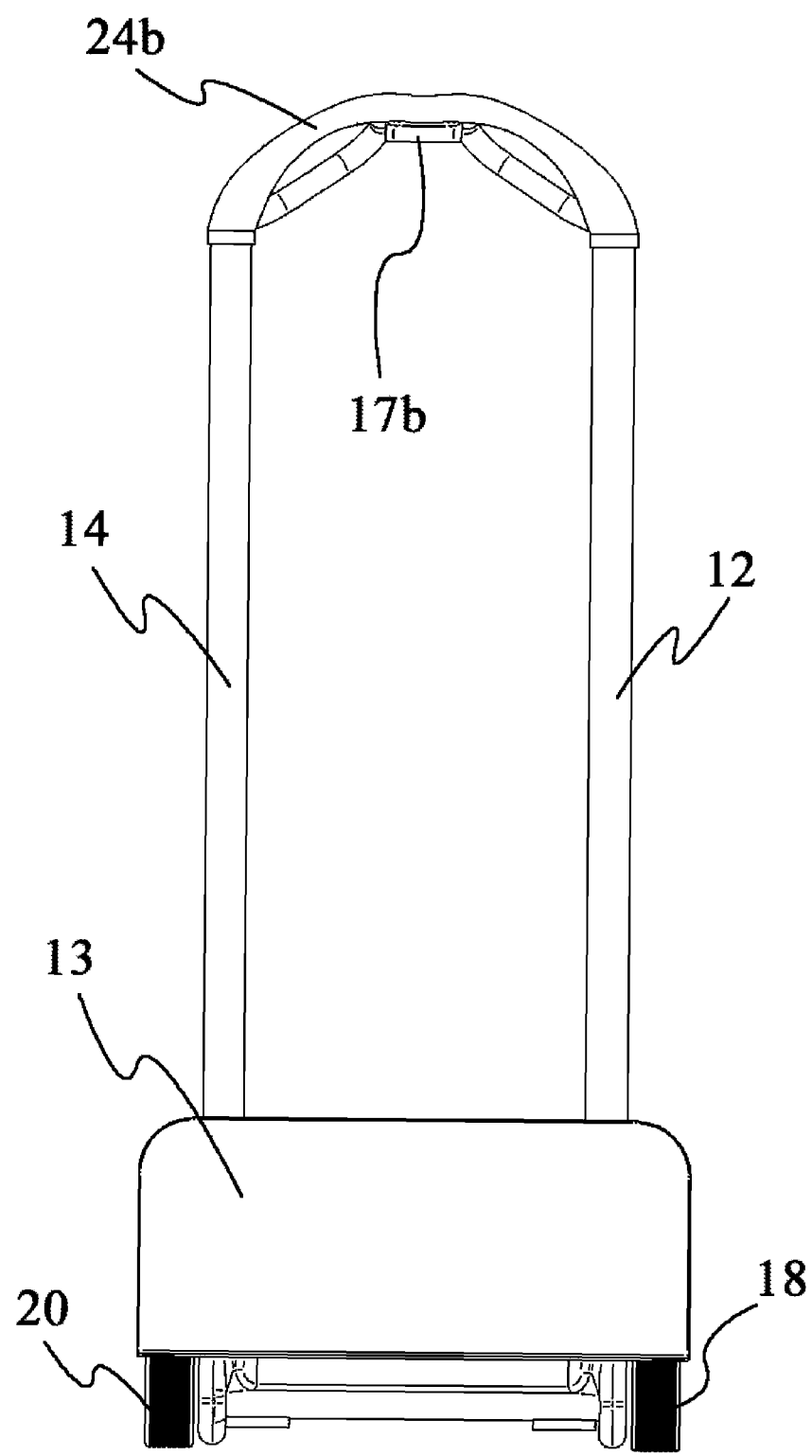
FIG. 15 is a front view of an alternative embodiment of the dolly depicted in FIG. 1.
Figure 16:
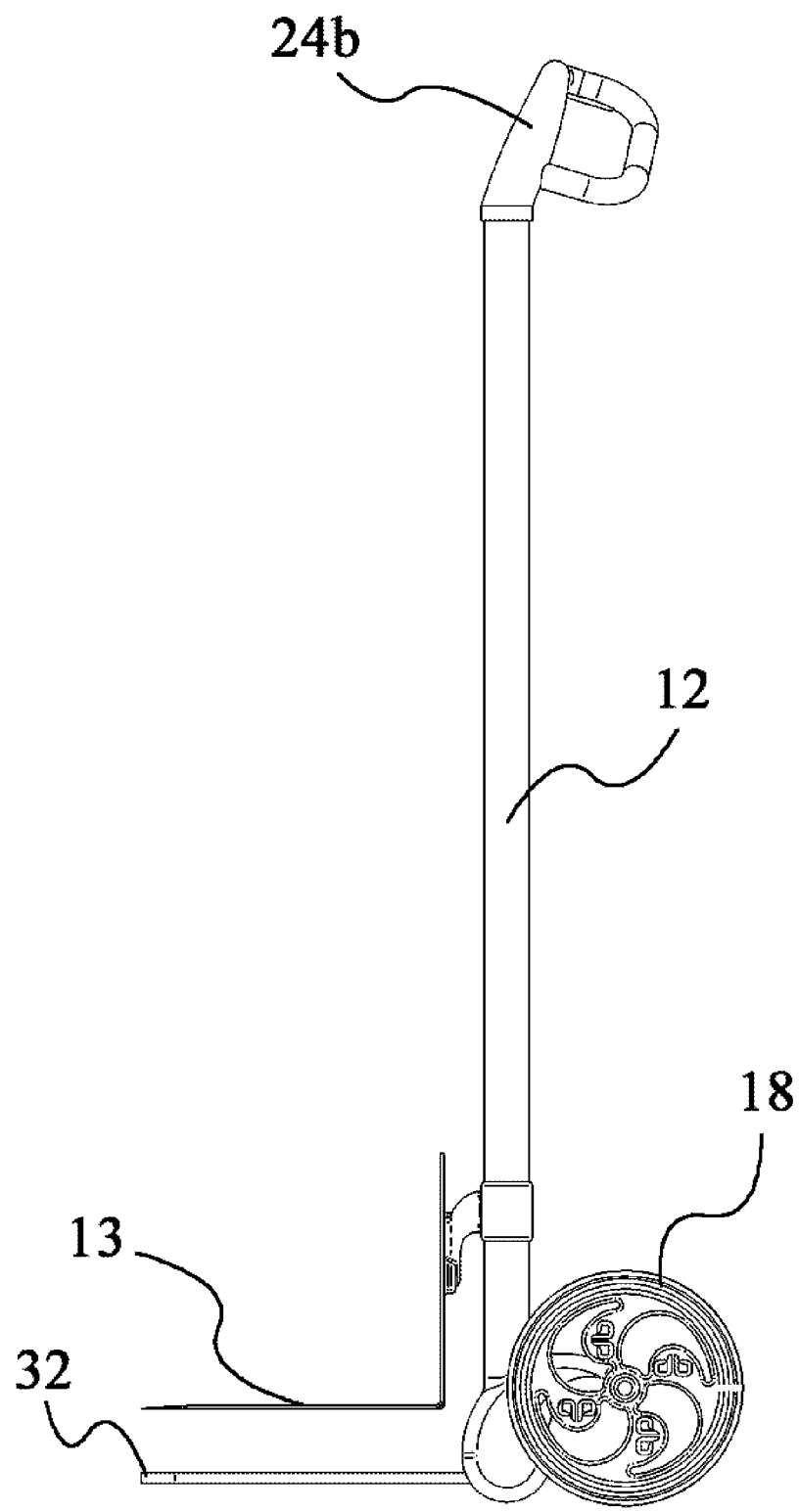
FIG. 16 is a side view of the dolly in FIG. 15.

Referring now to FIG. 13 and FIG. 14, one exemplary embodiment of the invention comprising a dolly structure comprising an electronic module and including two vertical support rails with each rail housing a ball screw rotatably associated with a ball nut, eat ball nut further mechanically associated with a tray where the tray is at the lower most position. For the presently preferred embodiment, the electronic module comprises scale (130) mechanically associated with tray (13) and further electrically associated with controller (132). Controller (132) comprises user interface (136). While user interface (132) is portrayed as having a built-in visual display screen, it should be recognized that user interface (132) may comprise a plurality of physically separated but cooperatively associated electronic devices that are not shown independently such as a radiofrequency transmitter and receiver, a processor, one or more display means such as a LCD, a magnetic card reader, biosensor, an audio speaker, and the like, each communicating with or under control of the a central processing device. For the preferred embodiment, scale (130) comprises display (134) for displaying information to a user such as power status, current weight data, and diagnostic status.

Figure 17:
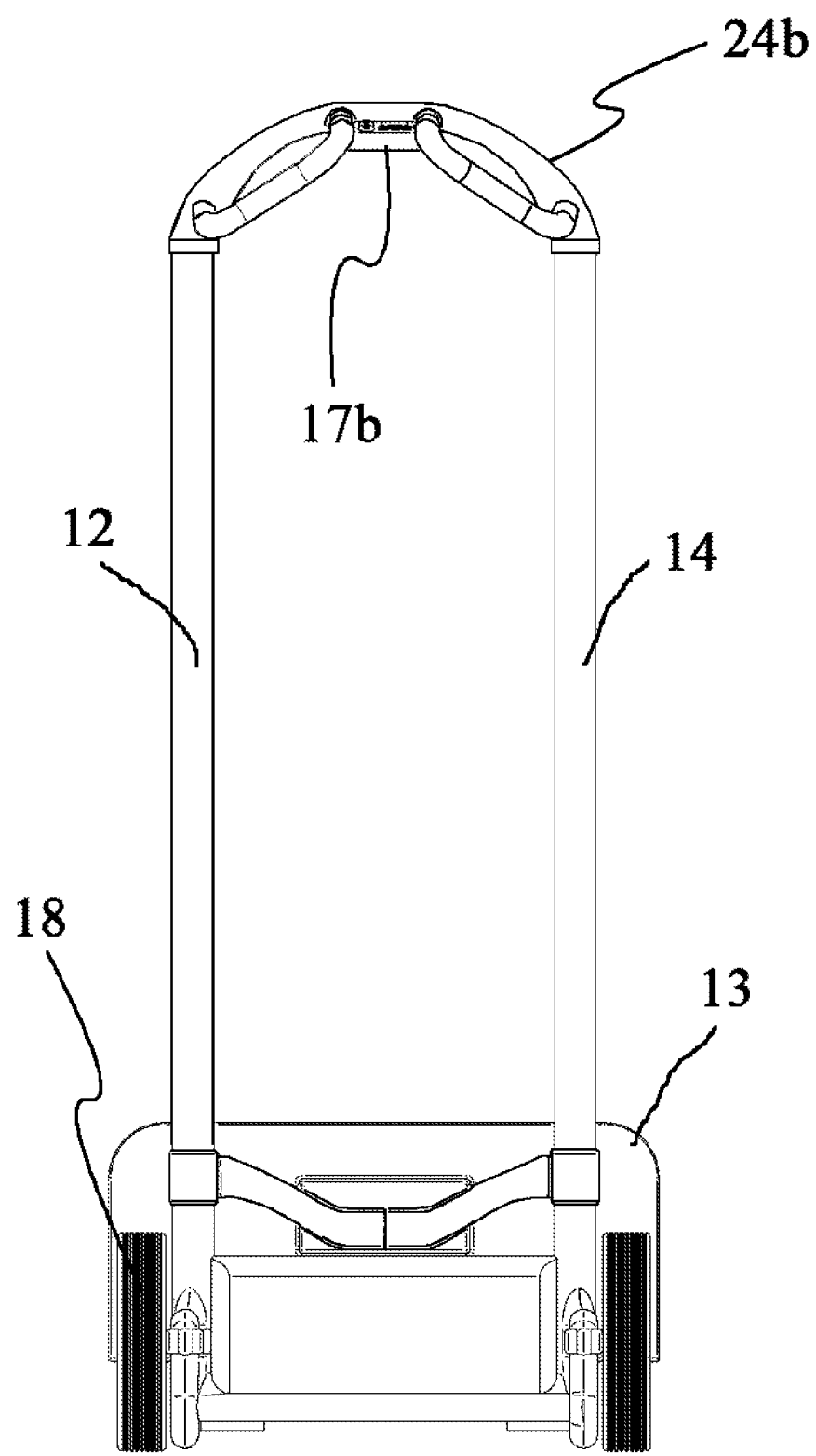
FIG. 17 is a back view of the dolly in FIG. 16.

Referring now to FIG. 15, FIG. 16, FIG. 17, and FIG. 18, one alternative embodiment of the invention comprising an electronic module (17b) including optional scale (130) and certain ornamental features is considered. As before vertical support column (12) and (14) are configured to house a vertical movement facilitator. As shown in FIG. 17, the vertical movement facilitators are mechanically associated with cross member (142) and the back of tray (13). Bottom housing (140) is configured to house a drive system comprising a force-to-movement converter, a power source and drive gearing; each cooperatively associated with one another to active the vertical movement facilitators. The drive system is further electrically associated with controller (17b) disposed between the midpoint of upper handle portion (24b).

Figure 19:
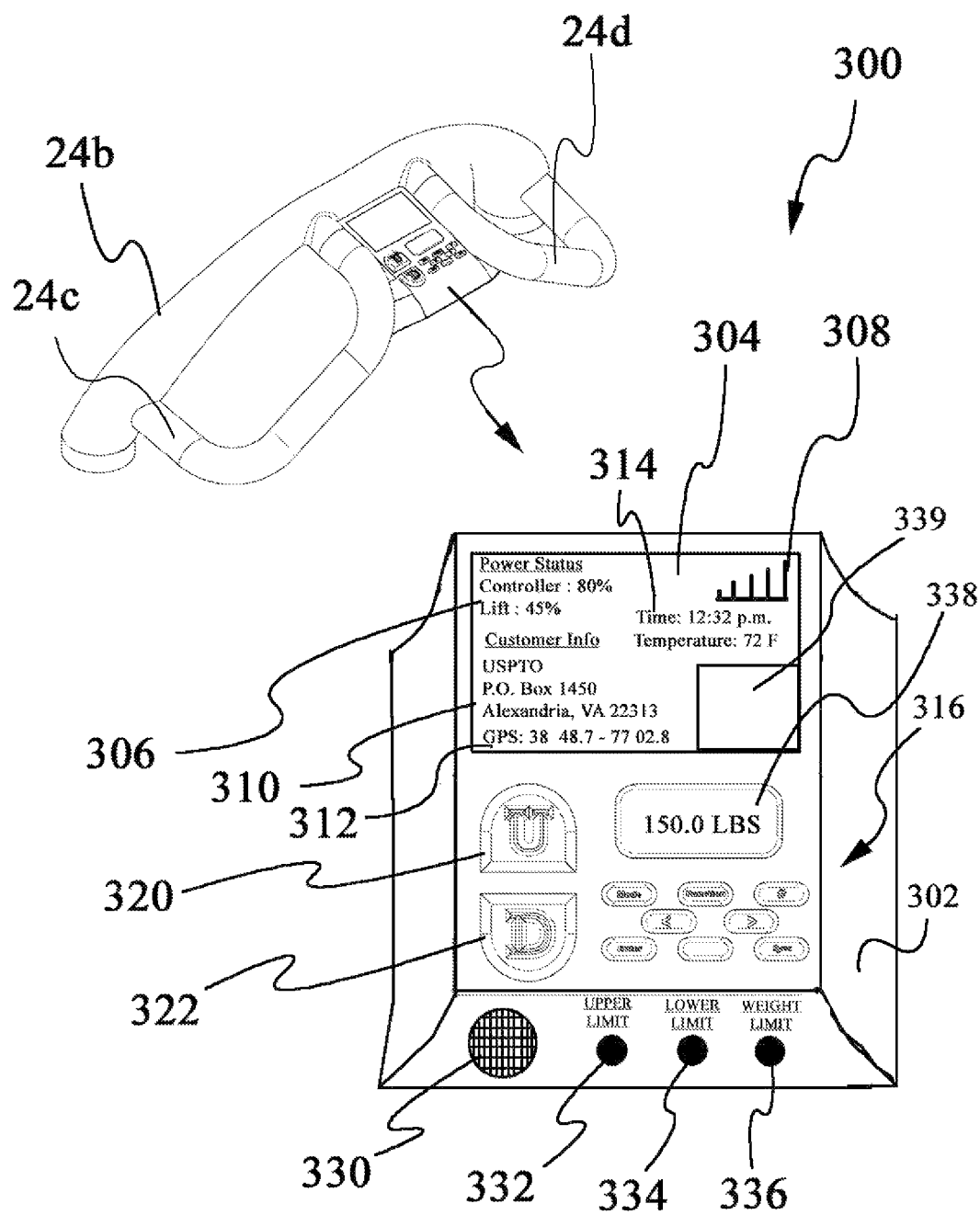
FIG. 19 is a top perspective view of a control unit for the dolly depicted in FIG. 15.

Referring now to FIG. 19, one exemplary embodiment of a user interface (300) is presented. User interface (300) comprises housing (302) suitable shaped to mechanically associate with handle (24b), and is disposed between grip portion (23c) and grip portion (23d) as shown in FIG. 19. Housing (302) is further suitable for housing the various electronic components depicted in FIG. 22 and described below.

User interface (300) comprises display (304) suitably configured for presenting data to a user. One exemplary display configuration includes the following notifications: power status (306), signal strength (308), customer information (310), location data (312), and time data (314). Other user interface (300) display configurations are preferably user selectable using programming buttons (316) or a remote electronic device via a wired or wireless communication connection and may include any data that is generated by the electronics or received by the electronics.

User interface (300) further comprises up control button (320) and down control button (322). A user simply presses the appropriate control button to move tray (13) in a desired direction.

User interface (300) may further comprise audio interface (330) and status indicators (332, 334, and 336). For the presently preferred embodiment, such status indicators include upper limit (332), lower limit (334) and weight limit (336). Upper limit (332) activates when tray (13) has moved to the upper most positioned allowed. Lower limit (334) activates when tray (13) has moved to the lower most positioned. Weight limit (336) activates when an item placed on tray (13) exceeds a predefined maximum weight. Such predefined maximum weight is preferably user programmable. Additionally, for this embodiment of the invention, when weight limit (336) has been activated, the vertical movement facilitators cannot be activated and tray (13) cannot be moved.

Block Diagram

Figure 22:
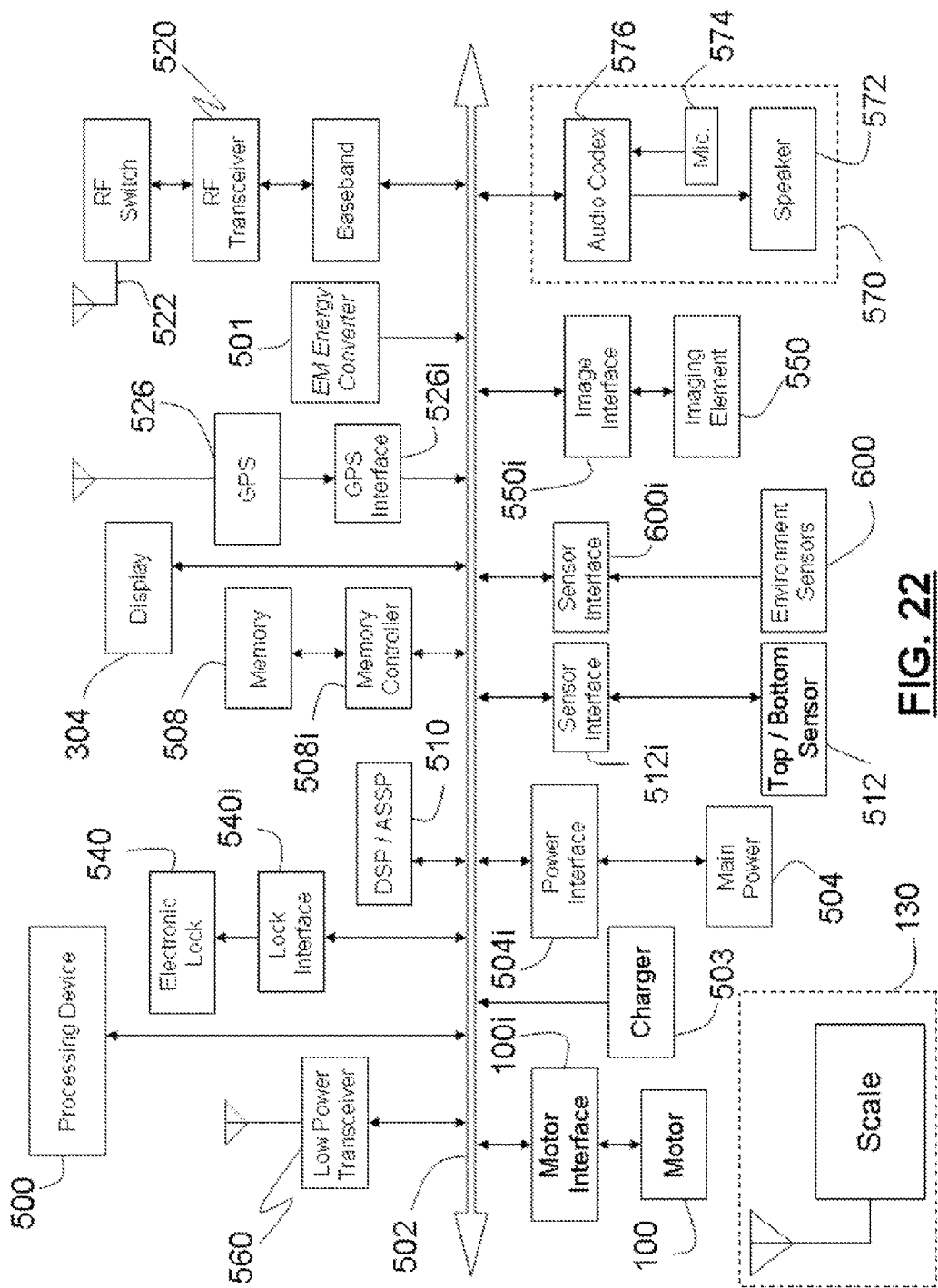
FIG. 22 is a block diagram representation of an electronic module for the dolly in FIG. 15. Repeat use of reference characters throughout the present specification and appended drawings is intended to represent the same or analogous features or elements of the present technology.

Referring now to FIG. 22, a block diagram representation of the various electronic components of user interface (300) is presented. Initially it should be appreciated that FIG. 22 presents just one of a plurality of methods of electrically associating the various electronic components to achieve the features desired. For example, FIG. 22 presents the use of a common buss (502) for electrically associating the various components. It should be appreciated that embodiments where certain devices are electrically associated with each other without the use of a buss fall within the scope of the invention. In addition, various embodiments of user interface (300) may include all the features presented in FIG. 22, only a subset of subset of such features as well as features not specifically presented in FIG. 22.

For the preferred embodiment, the functional blocks of FIG. 22 represent ASSPs (Application Specific Standard Product), Complex Programmable Logic Devices (CPLD), ASICs (application specific integrated circuit), microprocessors, or PICs. In addition, one or more functional blocks may be integrated into a single device or chip sets such as ASSP chip sets. For example, one or more of the various interfaces described below may be integrated into (or have its described functions performed by) processing device (500).

Manufactures of suitable ASSP devices include Motorola, and Texas Instruments. While most of the functions are preferably performed by ASSP chip sets, Complex Programmable Logic Devices (CPLD) may be used to interface the various ASSP blocks to system buss (502) allowing one system component to interface with another component. Manufactures of suitable CPLD devices include Lattice's (ispMACH 4000 family) and (Altera's MAX 7000-series CPLD).

For the presently preferred embodiment of the invention, processing device (500) is configured to perform various tasks including data management, data storage, data transfers, resource monitoring, and system monitoring. Processing device (500) may be a simple PIC (such as the ones manufactured by MicroChip) or a relatively more complicated processor configured for use with standard operating systems and application software. Other technologies that may be used include ASICs (application specific integrated circuit) and ASSPs (application specific standard product). Processing device (500) may comprise onboard ROM, RAM, EPROM type memories. Processing device (500) is electrically associated with buss (502).

Buss (502) is configured for providing a communication path between the various electronic devices electrically associated with buss (502). For example, Buss (502) is configured for transferring data signals between processing device (500) and other electronic devices electrically associated with buss (502). For the preferred embodiment, bus (502) also comprises electrical paths for transferring power between main power (504), EM power/energy converter (501) and other electronic devices electrically associated with buss (502). Buss (502) my further comprise a data port and or a power port configured for supplying/receiving power or providing a communication path to electronic devices electrically associated with such port.

Memory (508) is electrically associated with buss (502) via memory controller (508*i*). Memory (508) may be any type of memory suitable for storing data such as flash memory, SRAM memory, hard drive memory, as well as other types of memories. Volatile memory continuously connected to a power source may be used, although, for the preferred embodiment, memory (508) is nonvolatile memory. Memory (508) may be used for storing all types of data including application programs, image data, sound data, customer information, sensor data, and warning-criteria. Memory (508) is electrically associated with processing device (500) via memory controller (508*i*) and buss (502).

DSP/ASSP (510) is electrically associated to processing device (500) via buss (502). DSP (510) is configured to perform signal processing tasks such as voice, audio, video, encoding, decoding as well as other data and signal processing functions.

Display (304) is configured for displaying the various user interface (300) data. Display (304) is electrically associated with buss (502) and may include technology for providing a customizable touch screen controller configured for control and decoding functions for display (304). For the preferred embodiment display (304) is a LCD display. Additionally, for one embodiment, display (304) comprises a "memory" configured to provide an image when power is removed from the display. For this embodiment, an image is written on the LCD display and when power is removed, the display will retain the image virtually indefinitely. Such a LCD display uses a technique developed by Zenithal Bistable Devices (ZBD), which adds a finely ridged grating to the inner glass surface of an LCD cell of Super-Twist-Nematic (STN) construction. As is known in the art the presence of the grating "latches" the polarization state of the liquid crystals and retains it when power is removed.

User interface (300) my further comprise a graphics accelerator that provides support for megapixel cameras and 3D graphics applications. One suitable graphics accelerator is the MQ2100 manufactured by MediaQ.

For the presently preferred embodiment, motor (100) is electrically associated with processing device (500) through motor interface (100*i*). Processing device (500) is configured to receive movement signals from control buttons (320) and (322). Upon receiving movement signals, processing device (500) generates movement data that is transferred to motor interface (500*i*). Motor interface (500*i*) then causes motor (100) to move according to the received movement data. Processing device (500) is further configured to receive limit data generated by one of the Top/Bottom limit sensors (512). Limit sensors (512) are electrically associated with processing device (500) and/or motor interface (500*i*) through buss (502). If a limit sensor is activated, processing device (500) generates the appropriate movement data that is transferred to motor interface (500*i*) and tray movement is stopped. It should be appreciated that embodiments where motor interface (500*i*) monitor limit sensors (512) and control buttons (320) and (322) fall with the scope of the invention.

Exemplary communication circuitry is now considered. For one embodiment, relatively long range wireless communication circuitry includes RF transceiver (520) configured to transmit and receive data signals to/from a remote electronic device. It should be noted that embodiments where such communication circuitry comprises only a transmitter or only a receiver fall within the scope of the invention. For one embodiment, transceiver (520) comprises a relatively low power transmitter that transmits a data signal in an unlicensed frequency band. Other embodiments include a relatively longer range transmitter comprising any number of well known technologies for wireless communications transmitting at a legal power level. For example, transceiver (520) may be configured to communicate over GPRS, GSM, GPRS, 3G, and EDGE enabled networks as well as WAP networks.

To facilitate remote access to user interface (300), a networking system, such as a local area network (LAN) may be utilized. In this presently preferred embodiment, processing device (500) and memory (508) are configured to form a TCP/IP protocol suite and an HTTP (HyperText Transfer Protocol) server to provide two-way access to the apparatus (10) data. Such TCP/IP protocols and HTTP server technology are well known in the art. For such an embodiment, user interface (300) includes an HTTP server and a TCP/IP protocol stack. A gateway is provided that enables continuous remote access to the user interface (300).

Generally speaking, a gateway may simply be a means for connecting two already compatible systems. Alternatively, a gateway may be a means for connecting two otherwise incompatible computer systems. For such an alternative configuration, the TCP/IP protocol suite may be incorporated into a gateway serving multiple user interface (300) devices via a wired or wireless two-way network using, for example, Wireless Fidelity (Wi-Fi) technology. Such a gateway may incorporate an HTTP server for accessing data from multiple user interface (300) devices and for transmission of data to individual user interface (10) devices.

In the above described TCP/IP enabled user interface (300) system, a remote transceiver provides access to a first network operating in accordance with a predetermined protocol (TCP/IP is one example). A plurality of user interface (300) devices may comprise a second network, such as a LAN. A gateway operatively couples the first network to the second network. Finally, an HTTP server is embedded in either the gateway or the plurality of user interface (300) devices facilitating the transfer of data between the two networks. With such a configuration, one of ordinary skill in the art will appreciate that individual user interface (300) devices or groups of user interface (300) devices may be accessed as if the user interface (300) devices were a web site and their information could be displayed on a web browser.

User interface (300) may further be configured for storing and/or generating location data (312). For embodiments that generate location data, user interface (300) includes a GPS device (526) electrically associated with processing device (500) via buss (502) and GSP Interface (526*i*). GPS (526) is one embodiment of a position-finder electrically associated with a processing device where GPS (526) is configured to generate position-data for the location of user interface (300). For such configurations, processing device (500) is configured to use such position-data to retrieve customer information stored in memory (508). If the customer information exists for a current position-data location, such customer information is retrieved and the user is provided an opportunity to use such data for the activity of interest. If the customer information does not exist, processing device (500) is further configured to create a new customer file for such position-data. The new position-data may be associated with customer information for further reference. Similarly, if apparatus (10) can not be located (perhaps it was "borrowed"), processing device (500) is further configured to transmit a data signal using RF transceiver (500) at least one of random intervals, predefined cyclic intervals, and upon remote request.

The attributes of exemplary main power (504) are now considered. For the presently preferred embodiment, main power (504) is a long life depletable power source such as a Li Ion battery that is independent from power source (110). For such embodiment, main power (504) comprises at least one long life rechargeable Li Ion battery such as the ones manufactured by A123 Systems®. Alternatively, (504) may be electrically associated with power source (110) or may be replaced by power source (110).

Extending the life of main power (504) or extending the time between recharging is one design concern addressed by power interface (504i). Power Interface (500i) is configured to perform power management functions for the system as well as monitor the status of main power (504) and report such status to devices electrically associated with buss (502) (such as processing device (500)). Power interface (504i) dynamically addresses power management issues by selectively powering down unutilized devices. For the Preferred embodiment, power interface (504i) is a CPLD that generates chip-select signals and powers down the various ASSPs as desired. Alternatively, processing device (500) may perform such power management functions.

Electronic lock (540) is electrically associated with processing device (500) through lock interface (540i) and buss (502). For this embodiment, lock interface (540i) is an ASSP or CPLD device configured to change the state of electronic lock (540) in response to control signals received from processing device (500). Similarly, lock interface (540i) may be further configured to communicate the status of electronic lock (540) to devices electrically associated with buss (502). Electronic lock (540) may be a software lock that prevents access to various functions provided by user interface (500). In addition, electronic lock (540) may further be a mechanical lock that prevents wheels (18) and (20) and/or tray (13) from moving.

Imaging element (550) is electrically associated with processing device (500) through image interface (550i) and buss (502). Imaging element (550) and image interface (550i) are configured for acquiring and transferring images to electronic devices electrically associated with buss (405). For the preferred embodiment, imaging interface (550i) is configured to support CMOS image input sensors such as the one manufactured by Micron® and/or CCD (charge-coupled device) image input sensors such as the ones manufactured by ATMEL® sensors. Imaging interface (550i) performs the necessary processing functions to convert the imaging data into a desired format before transferring such data to other devices associated with buss (502).

Low Power transceiver (560) would typically comprise a low power transmitter relative to transceiver (520). For the embodiment in FIG. 22, low power transceiver (560) operates in an unlicensed band although frequencies requiring a license may be used. Suitable technologies include Bluetooth and Zigbee (IEEE 802.15). Zigbee is a low data rate solution for multi-month to multi-year battery life applications. Zigbee operates on an unlicensed, international frequency band. Such technologies are known and understood by those skilled in the art, and a detailed explanation thereof is not necessary for purposes of describing the method and system according to the present invention. Low power transceiver (550) is configured for short range communication with other suitably configured devices such as scale (130). As will be described below, one embodiment of the invention include a wireless scale (130) configured for transmitting scale data to processing device (500) via low power transceiver (560).

Attention now is directed to audio module (570). For the preferred embodiment, audio module (570) comprises speaker (572) and microphone (474) electrically associated with audio codex (576). Audio module (570) is configured for detecting sound waves and converting such waves into digital data of a predefined format such as MP3. Sound waves may also be generated by audio module (570) using speaker (572) to issue warnings and provide for other forms of communications. For example, audio module (570) may be used for voice communications between a person located at user interface (300) and a person located at a remote site, using, for example, VoIP for the IP enabled systems describe earlier.

EM (electromagnetic) Energy Converter (501) is associated with a portion of the outer sides of user interface (300). EM Energy Converter (501) is configured to convert electromagnetic energy (such as a radiated RF signal from a man made transmitter, sunlight, etc.) into a voltage for supplying power to system components and/or supplying energy to a power source. One well known EM Energy Converter is a photovoltaic cell.

User interface (300) may further comprise a card reader, optional keyboard, and a biometric sensor (339). Such carder reader is preferably a standard magnetic strip reader or smart card reader well known in the art. Using such carder reader, customer information and payment information may be transferred to memory (508) or transmitted to a remote device using RF transceiver (520).

The Biometric sensor (339) is used to keep a customer's personal information secure using biometric identification. Biometric identification refers to the automatic identification of a person based on his/her physiological or behavioral characteristics. A biometric system is essentially a pattern recognition system which makes a personal identification by determining the authenticity of a specific physiological or behavioral characteristic possessed by a user. The biometric system may include, for example, a handwriting recognition system, a voice recognition system and fingerprint recognition.

For the preferred embodiment of the invention, biometric sensor (339) is a fingerprint scanner. For such embodiment of the invention, a user initially places a finger on biometric sensor (339). The biometric sensor scans the finger and transfers a digital representation of the user's fingerprint to memory (508). Such an initial bio sample is called an enrolment sample. After an enrolment sample has been stored in memory, future user interface (300) transactions are authorized by processing device (500) using biosensor data.

For embodiments of electronic module (300) comprising scale (130), numeric display (338) is provided for displaying weight information. Numeric display (338) is preferably an LCD display but any suitable display technology may be used. Additionally, display (304) may be configured to display weight information and display (338) is either eliminated or used to display redundant weight information as well as other information.

Figure 20:
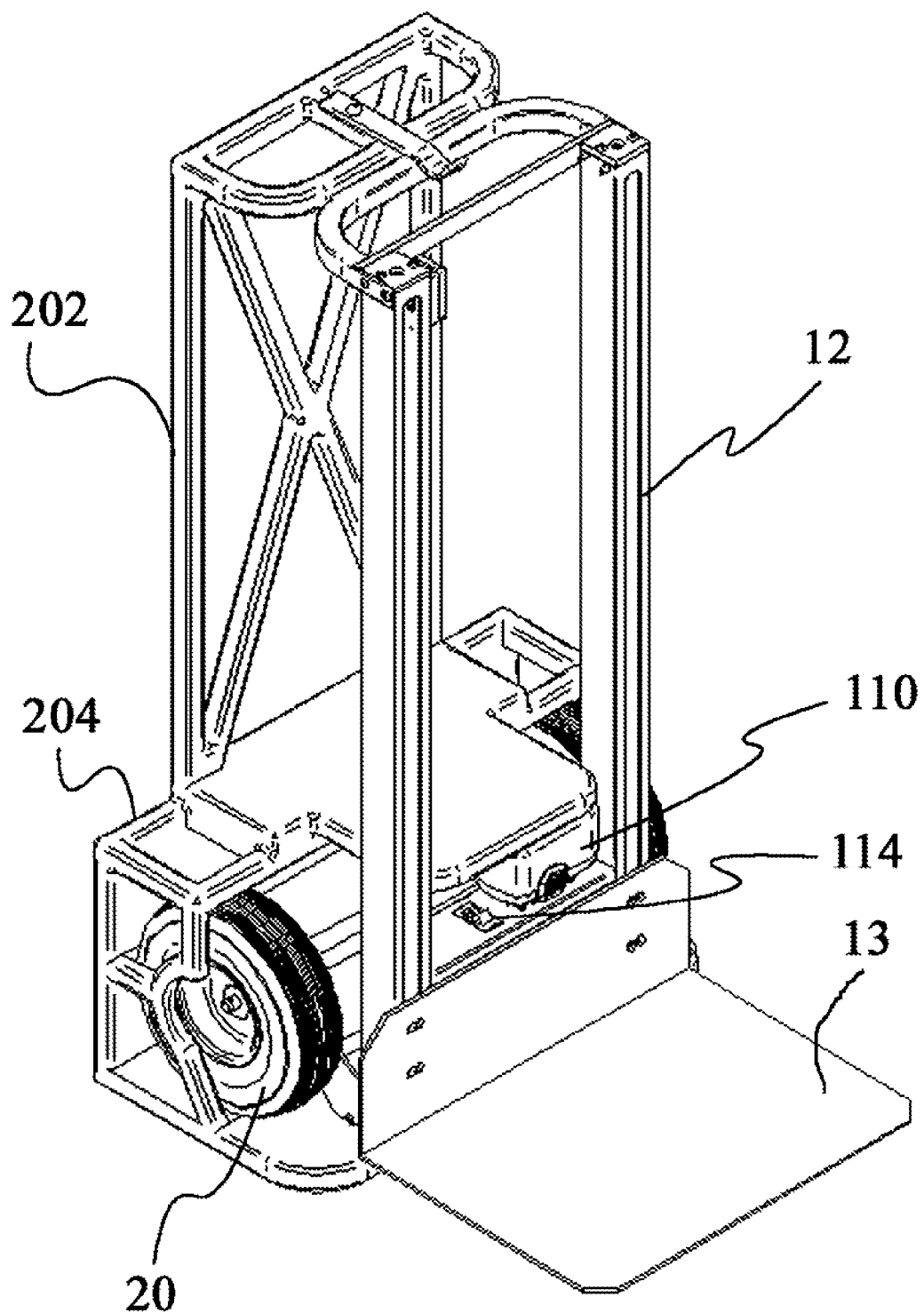
FIG. 20 is a side perspective view of a dolly associated with a docking station.
Figure 21:
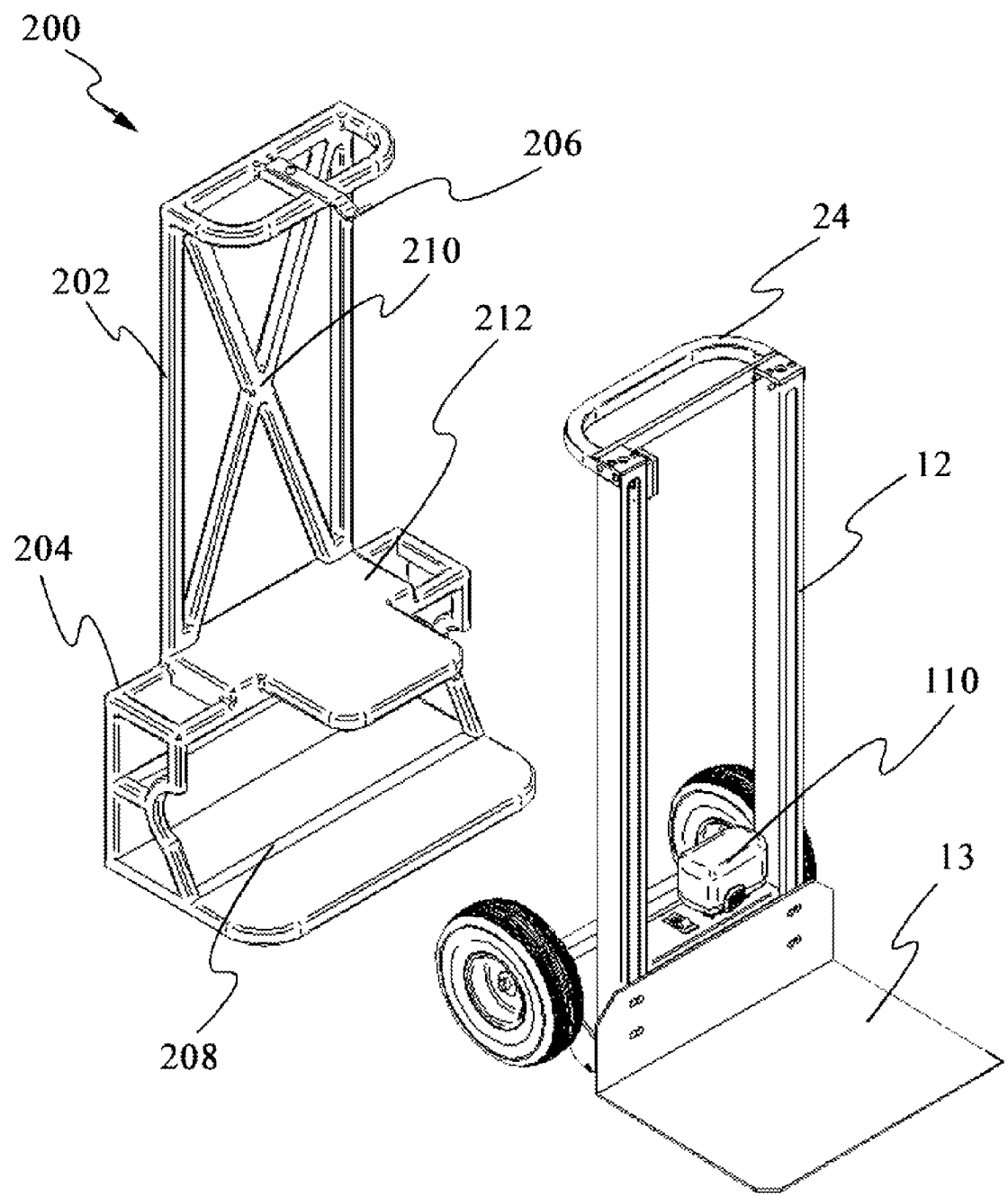
FIG. 21 is a side perspective view of the apparatus in FIG. 20 with the dolly removed from the docking station.

Referring now to FIG. 20 and FIG. 21, one exemplary docking station is presented. Docking station (200) is configured for being mechanically associated with a structure where apparatus (10) is to be stored when not being used to transport items. Such structure may be a surface of vehicle, a surface of a building (i.e. wall), or any other structure. Docking station (200) preferably includes a charging interface for recharging one or both of power source (110) and main power (504). For such embodiment, user interface (132) or (300) is movably associated with upper section (24) so that it may be repositioned to allow for easy viewing and use while apparatus (10) is associated with docking station (200). For such a configuration, the docking station may be associated with a surface of a truck (i.e. a delivery truck) and packages placed on scale (130) without removing apparatus from docking station (200). The package weight can then be accurately recorded and selected information automatically transferred to another electronic device when desired.

Figure 18:
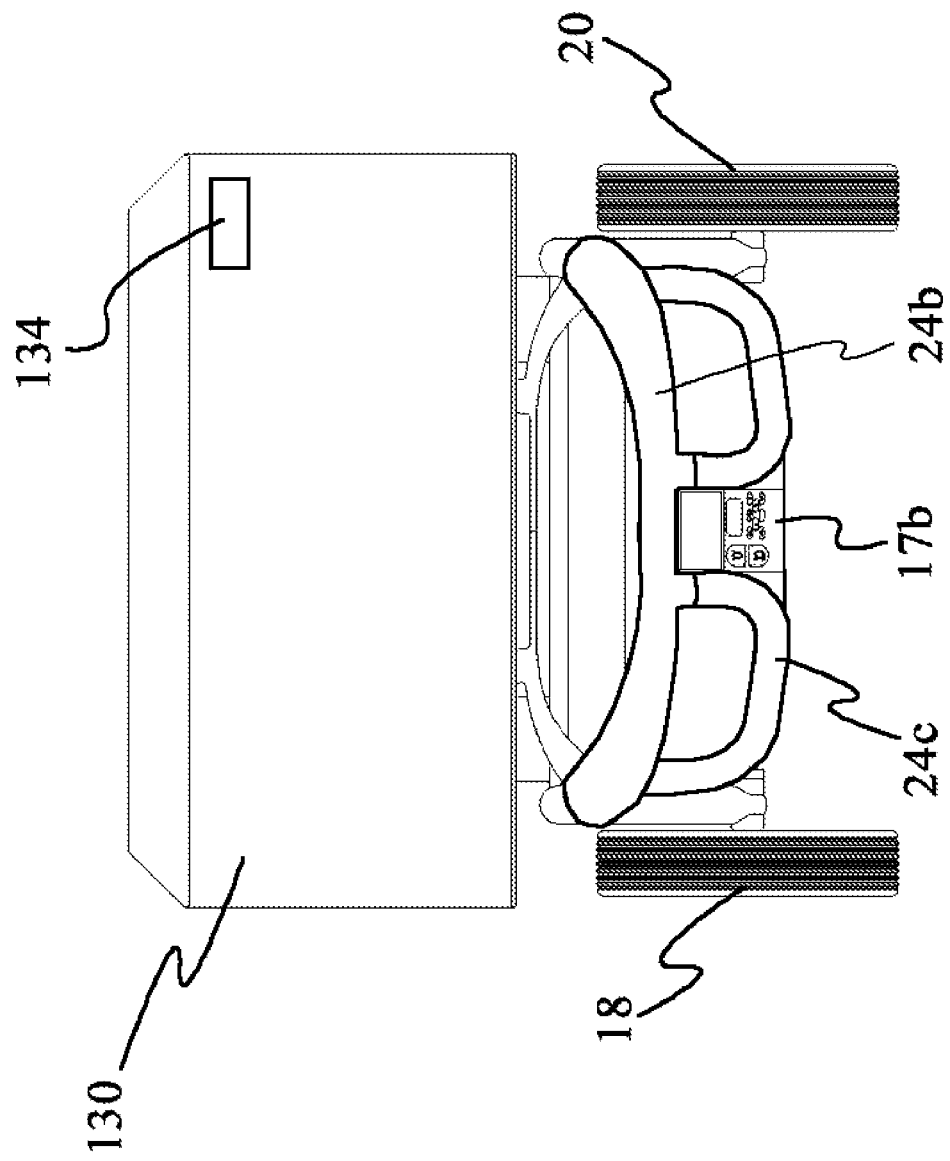
FIG. 18 is a top view of the dolly in FIG. 15.

Attention is now directed to scale (130) as depicted in FIG. 13 and FIG. 18. Scale (130) is either a separate module mechanically associated with tray (13) or is an integral component of tray (13) and is configured to provide weight data in a user selectable format. Scale (130) comprises a wired or wireless communication connection with user interface (300). Some embodiments of scale (130) may further comprise a display (134) configured for displaying at least one of weight data, diagnostic data, battery status, and communication link status or any other desired information. Preferably, scale (130) includes an automatic shutoff when not in use for a predefined period of time. For one embodiment, a user presses a wakeup button associated with user interface (300) and scale (130) wakes up and "zeros." An item is then placed on scale (130) and weight data is generated. Such data may be stored locally in scale (130) and/or transferred to user interface (300).

It should be appreciated that for some embodiments, electronic module (17b) may be detachable from the apparatus and used as a mobile data system. For such a configuration, the apparatus has a controller port that is configured to receive electronic module (17b). Consequently, the "hand-truck" apparatus becomes more universal as a "hand-truck" may be controlled by any number of electronic modules (17b).

Electronic Functions

Electronic module (17b) is configured to provide one or more of the previously described functions. In addition, electronic module (17b) may be used to provide at least the plurality of functions now considered.

Initially, customer information is stored in memory (508). Exemplary customer information includes customer name, customer address, customer account number, customer billing rate, and customer position-data.

When a package is picked up from a customer site, user interface (300) is configured to generate position-data using GPS (526). User interface (300) then accesses customer information stored in memory (508) and searches for position-data that is within a predefined location-window (i.e. within 500 yards). Such location-window is preferably user programmable. A list of customers located within the location-window is presented to a user. The user selects the appropriated user or alternatively creates a new customer entry. The user then places an item on scale (130). Scale (130) generates weight data and transfers such data to user interface (300). User interface (300) stores such data in memory (508) and/or transmits such data to a remote location. When the weight data is stored in memory, user interface associates such weight data to the selected (or entered) customer information, time stamps and/or location stamps the weight data. The user may then enter a destination data defining where the item is to be transported. In addition, user interface (300) may be in communication with a shipping label generator. For such an embodiment, user interface (300) transfers the weight data, the relevant customer data, and the destination data to the shipping label generator and a shipping label is generated.

Another feature of the present invention relates to inventory control. In some locations, the invention may be used to transport items in a huge warehouse, store, or other similar location. User interface (300) is configured to provide directions to a user so that the item is transported to the proper location. For this embodiment, electronic module (17b) includes or is electrically associates with an item scanner configured for scanning an item and retrieving item information. The item scanner may be integral to scale (130), user interface (300), or in a separate housing electrically associated with user interface (300). Exemplary item scanners include bar code scanners and RFID scanners. For such an embodiment of the invention, an item is placed on scale (130) and weight data is generated. Item scanner is activated to retrieve item-data. The item-data is transferred to user interface (300). Such item data preferably includes expected-weight-data. User interface (300) compares the scale (130) generated weight-data to the expected-weight-data. If the two weights are outside a predefined threshold, user interface (300) generates a warning. User interface (300) further activates GPS (526) and retrieves position-data. User interface (300) accesses item-information stored in memory (508) or a remote memory using transceiver (520). Such item-information includes position-data that defines the location where the item is to be transported. User interface (300) then prompts a user where to take the item and my provide turn-by-turn directions and verification when the appropriate delivery location is reached.

Self diagnostic features are now considered. For one embodiment of the invention, user interface (300) is configured to maintain historical power-to-lift data. For such embodiment, user interface (300) is configured to monitor the power required to lift a load. It should be appreciated that heavier loads require more power to lift. However, the power requirements should be substantially constant for loads of equal weight. Thus, user interface (300) is configured to maintain power-to-lift data for a predefined number of loads. For example, assume the maximum load allowed is 150 lbs. User interface may be configured to maintain power-to-lift data for 50 lbs, 100 lbs and 150 lbs with a tolerance of 10%. Thus, with tolerances, user interface maintains historical power-to-lift data for loads ranging from 45-55 lbs, 90-110 lbs, and 135-150 lbs. When apparatus (10) lifts a load within one of the monitored ranges, user interface (300) accesses power drain information and compares such information to historical power drain information. For this embodiment of the invention, power drain information is generated by a power interface (504i) or some other well known technology for determining power drain. If the power drain is outside a predefined tolerance, user interface (300) issues a warning that the efficiency of apparatus (10) is out of specification. Such a warning should put a user on notice that apparatus (10) should be serviced.

If the current power-to-lift data is within tolerance, such data may be incorporated into the historical data. One exemplary embodiment of historical data is a running average although or suitable statistical techniques may be employed.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A portable apparatus for manually transporting items, the apparatus including a powered lifting feature, said apparatus comprising:
   a first vertically extending support column defining an upper portion and a lower portion, said first vertically extending support column housing a first vertical motion facilitator;
   a second vertically extending support column defining an upper portion and a lower portion, said second vertically extending support column housing a second vertical motion facilitator;
   a lower support member defining a first end and an opposing second end wherein said first end is mechanically associated with the lower portion of said first vertically extending support column and wherein said second end is mechanically associated with the lower portion of said second vertically extending support column;
   a first wheel carried adjacent to the lower portion of said first vertically extending support column;
   a second wheel carried adjacent to the lower portion of said second vertically extending support column;
   a handle portion defining a first handle end and a second handle end, wherein said first handle end is mechanically associated with the upper portion of said first vertically extending support column and wherein said second handle end is mechanically associated with the upper portion of said second vertically extending support column;
   a first vertical motion facilitator interface movably associated with said first vertical motion facilitator;
   a second vertical motion facilitator interface movably associated with said second vertical motion facilitator;
   a tray extending transversely from said vertically extending support columns, said tray mechanically associated with each vertical motion facilitator interface;
   a force-to-movement converter mechanically associated with said first vertical motion facilitator and said second vertical motion facilitator, said force-to-movement converter comprising a gearing assembly configured for transferring movement from said force-to-movement converter to said first vertical motion facilitator and said second vertical motion facilitator;
   a power source associated with said force-to-movement converter;
   a controller electrically associated with said force to movement converter and said power source, said controller configured for selectively activating said force-to-movement converter so that said vertical motion facilitators are selectively activated to move said tray in a desired direction; and
   wherein at least one of (a) said gearing assembly, and (b) at least one of said vertical motion facilitator interfaces, are configured to provide for self-breaking so that there is substantially no tray movement after the force-to-movement converter is deactivated.

2. A portable apparatus including a powered lifting feature as in claim 1, wherein at least one vertical motion facilitator is configured with a secondary activation point.

3. A portable apparatus including a powered lifting feature as in claim 1, wherein the vertical motion facilitators are screws.

4. A portable apparatus including a powered lifting feature as in claim 3, wherein said force-to-movement converter comprises an electric motor and said power source comprises a battery.

5. A portable apparatus including a powered lifting feature as in claim 4, wherein said screws are ball screws.

6. A portable apparatus including a powered lifting feature as in claim 5, wherein said first vertical motion facilitator interface is a ball nut and said second vertical motion facilitator interface is a ball nut.

7. A portable apparatus including a powered lifting feature as in claim 6, wherein said lower support member defines one of (a) an assembly housing, (b) an axel housing, and (c) an outrigger support, said portable apparatus further comprising a rear gusset support configured to maintain said vertically extending support columns perpendicular to the surface supporting said rear gusset support, said rear gusset support movably associated with at least one of (a) said lower support member, and (b) the lower portion of at least one vertically extending support column.

8. A portable apparatus including a powered lifting feature as in claim 5, further comprising a manual activation interface mechanically associated with one of said ball screws wherein said manual activation interface is configured to allow a user to manually activate said ball screw to selectively move the tray in a desired direction.

9. A portable apparatus including a powered lifting feature as in claim 5, further comprising support rails extending transversely from at least one of (a) the bottom portion of at least one vertically extending support column, and (b) said lower support member.

10. A portable apparatus for manually transporting items, the apparatus including a powered lifting feature, said apparatus comprising:
    a first vertically extending support column defining an upper portion and a lower portion, said first vertically extending support column housing a first vertical motion facilitator;
    a second vertically extending support column defining an upper portion and a lower portion, said second vertically extending support column housing a second vertical motion facilitator;
    a handle portion defining a first handle end and a second handle end, wherein said first handle end is mechanically associated with the upper portion of said first vertically extending support column and wherein said second handle end is mechanically associated with the upper portion of said second vertically extending support column;
    a lower support member defining a first end and an opposing second end wherein said first end is mechanically associated with the lower portion of said first vertically extending support column and wherein said second end is mechanically associated with the lower portion of said second vertically extending support column;
    a first wheel carried adjacent to the lower portion of said first vertically extending support column;
    a second wheel carried adjacent to the lower portion of said second vertically extending support column;

a first vertical motion facilitator interface movably associated with said first vertical motion facilitator;

a second vertical motion facilitator interface movably associated with said second vertical motion facilitator;

a tray extending transversely from said vertically extending support columns, said tray mechanically associated with said first vertical motion facilitator interface and said second vertical motion facilitator interface;

a force-to-movement converter mechanically associated with said first vertical motion facilitator and said second vertical motion facilitator, said force-to-movement converter configured for activating said first vertical motion facilitator and said second vertical motion facilitator;

a power source associated with said force-to-movement converter;

a controller electrically associated with said force-to-movement converter and said power source, said controller configured for selectively activating said force-to-movement converter so that said first vertical motion facilitator and said second vertical motion facilitator are selectively activated to move said tray in a desired direction;

a scale mechanically associated with said tray and electrically associated with said controller wherein said scale is configured to determine item weight data and transfer said item weight data to said controller; and wherein said controller is configured to compare the received item weight data to verify the item weight data falls within a predefined range before activating the force-to-movement converter.

11. A portable apparatus for manually transporting items as in claim 10, wherein said controller is electrically associated with said force-to-movement converter and said power source through releasable connection.

12. A portable apparatus for manually transporting items as in claim 11, wherein said controller comprises:

a processing device electrically associated with a memory;

a display electrically associated with the processing device and configured for displaying data;

at least one environment sensor configured for generating environment-data related to an environmental parameter for the apparatus' environment;

a transmitter electrically associated with the processing device and configured for transmitting data to a remote location; and a power source electrically associated with at least said processing device, said memory, said transmitter, and said display.

13. A portable apparatus for manually transporting items as in claim 12, wherein said at least one environment sensor is a global positioning system (GPS) sensor configured to generate position-data for the controller, said position-data representing the current location of the controller.

14. A portable apparatus for manually transporting items as in claim 13, wherein said memory is configured to store customer-information comprising location-data and wherein said processing device is configured to use said position-data to retrieve the customer information associated with the current location of said controller and associate said item weight data with the retrieved customer information thereby defining customer-information-item-weight-data.

15. A portable apparatus for manually transporting items as in claim 14, wherein said controller is further configured to transmit a data signal comprising at least part of said customer-information-item-weight-data to a remote location.

16. A portable apparatus for manually transporting items as in claim 15, wherein said controller further comprises an imaging sensor electrically associated with said processing device, wherein said processing device is further configured to use said imaging sensor to generate and record image-data for said item and wherein said processing device is further configured to associate said image-data with said customer information.

17. A portable apparatus for manually transporting items as in claim 10, wherein said lower support member defines one of (a) an assembly housing, (b) an axel housing, and (c) an outrigger support, and further comprising a rear gusset support movably associated with at least one of (a) said lower support member, and (b) the lower portion of at least one vertically extending support column.

18. A portable apparatus for manually transporting items, the apparatus including a powered lifting feature, said apparatus comprising:

a first vertically extending support column defining an upper portion and a lower portion and a second vertically extending support column defining an upper portion and a lower portion and wherein said first vertically extending support column and said second vertically support column are substantially the same length;

a lower support member defining a first end and an opposing second end wherein said first end is mechanically associated with the lower portion of said first vertically extending support column and wherein said second end is mechanically associated with the lower portion of said second vertically extending support column;

a handle portion defining a first handle end and a second handle end, wherein said first handle end is mechanically associated with the upper portion of said first vertically extending support column and wherein said second handle end is mechanically associated with the upper portion of said second vertically extending support column;

a vertical motion facilitator defining a upper portion and a lower portion and wherein the length of said vertical motion facilitator is substantially equal to the length of the vertically extending support columns and wherein the upper portion of said vertical motion facilitator is movably associated with said handle portion and wherein the lower portion of said vertical motion facilitator is movably associated with said lower support member;

a first wheel carried adjacent to the lower portion of said first vertically extending support column;

a second wheel carried adjacent to the lower portion of said second vertically extending support column;

a vertical motion facilitator interface movably associated with said vertical motion facilitator;

a tray extending transversely from said support columns, said tray mechanically associated with said vertical motion facilitator interface;

a power source;

a force-to-movement converter mechanically associated with said first vertical motion facilitator and said second vertical motion facilitator, said force-to-movement converter comprising a gearing assembly configured for transferring movement from said force-to-movement converter to said vertical motion facilitator;

a controller electrically associated with said power source and said force-to-movement converter, said controller configured for selectively activating said force-to-movement converter so that said vertical motion facilitator is selectively activated to move said tray in a desired direction;

a scale mechanically associated with said tray and electrically associated with said controller wherein said scale is configured to determine item weight data and transfer said item weight data to said controller; and wherein said controller is configured to compare the received item weight data to verify the item weight data falls within a predefined range before activating the force-to-movement converter.

19. A portable apparatus for manually transporting items as in claim 18, wherein said controller comprises:

a processing device electrically associated with a memory;

a display electrically associated with the processing device and configured for displaying data;

at least one environment sensor configured for generating environment-data related to an environmental parameter for the apparatus' environment;

a first transmitter electrically associated with said processing device and configured for transmitting data to a remote first location;

a bio-sensor electrically associated with said processing device and configured for generating bio-data;

an imaging element electrically associated with said processing device and configured for generating image-data;

a location sensor electrically associated with said processing device and configured for generating location-data;

a transceiver electrically associated with said processing device and configured for short range data transmissions; and a controller power source electrically associated with at least said processing device, and said memory.

20. A portable apparatus for manually transporting items as in claim 19, wherein said memory is configured to store customer data comprising customer name, customer location data, and customer bio-data and wherein said processing device is configured to:

use said bio-sensor to determine bio-data for a customer with an item to be transported;

use said location sensor to generate location-data for at least one of (a) the customer with an item to be transported, and (b) the item to be transported;

use at least one of said bio-data and said location-data to retrieve stored customer data;

use said retrieved stored customer data and item weight data to generate billing data; and use said transceiver to transfer said billing data to a local device to generate a shipping label and a customer receipt.

* * * * *